(12) United States Patent
Beaufays et al.

(10) Patent No.: US 11,749,261 B2
(45) Date of Patent: Sep. 5, 2023

(54) MIXED CLIENT-SERVER FEDERATED LEARNING OF MACHINE LEARNING MODEL(S)

(71) Applicant: Google LLC, Mountain View, CA (US)

(72) Inventors: Françoise Beaufays, Mountain View, CA (US); Andrew Hard, Menlo Park, CA (US); Swaroop Indra Ramaswamy, Belmont, CA (US); Om Dipakbhai Thakkar, San Jose, CA (US); Rajiv Mathews, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 199 days.

(21) Appl. No.: 17/197,954

(22) Filed: Mar. 10, 2021

(65) Prior Publication Data
US 2022/0293093 A1 Sep. 15, 2022

(51) Int. Cl.
*G10L 15/065* (2013.01)
*G10L 13/04* (2013.01)
(Continued)

(52) U.S. Cl.
CPC ............ *G10L 15/065* (2013.01); *G10L 13/04* (2013.01); *G10L 15/26* (2013.01); *G10L 15/30* (2013.01)

(58) Field of Classification Search
CPC ........ G06F 40/295; G06F 40/30; G06F 40/20; G06F 40/00; G10L 15/00; G10L 15/06;
(Continued)

(56) References Cited

U.S. PATENT DOCUMENTS

| | | | |
|---|---|---|---|
| 2021/0117780 A1* | 4/2021 | Malik | G06F 40/35 |
| 2022/0083904 A1* | 3/2022 | Pastore | G06N 20/00 |
| 2023/0010686 A1* | 1/2023 | Lesh | G16H 50/70 |

FOREIGN PATENT DOCUMENTS

WO WO-2022084125 A1 * 4/2022

OTHER PUBLICATIONS

Albaseer, Abdullatif; Ciftler, Bekir Sait; Abdallah, Mohamed; Al-Fuqaha, Ala, Exploiting Unlabeled Data in Smart Cities using Federated Edge Learning, Jun. 19, 2020, IEEE (Year: 2020).*
(Continued)

*Primary Examiner* — Andrew C Flanders
*Assistant Examiner* — Alexander Joongie Kim
(74) *Attorney, Agent, or Firm* — Gray Ice Higdon

(57) ABSTRACT

Implementations disclosed herein are directed to federated learning of machine learning ("ML") model(s) based on gradient(s) generated at corresponding client devices and a remote system. Processor(s) of the corresponding client devices can process client data generated locally at the corresponding client devices using corresponding on-device ML model(s) to generate corresponding predicted outputs, generate corresponding client gradients based on the corresponding predicted outputs, and transmit the corresponding client gradients to the remote system. Processor(s) of the remote system can process remote data obtained from remote database(s) using global ML model(s) to generate additional corresponding predicted outputs, generate corresponding remote gradients based on the additional corresponding predicted outputs. Further, the remote system can utilize the corresponding client gradients and the corresponding remote gradients to update the global ML model(s) or weights thereof. The updated global ML model(s) and/or the updated weights thereof can be transmitted back to the corresponding client devices.

20 Claims, 9 Drawing Sheets

(51) Int. Cl.
   *G10L 15/26*   (2006.01)
   *G10L 15/30*   (2013.01)
(58) Field of Classification Search
   CPC ....... G10L 15/065; G10L 15/22; G10L 15/26;
         G10L 15/28; G10L 15/30; G06N 20/00;
            G06N 20/08; G06N 20/088; G06N
            20/0445; G06N 20/0454; G06N 20/20
   See application file for complete search history.

(56) References Cited

OTHER PUBLICATIONS

McMahan et al.; Communication-Efficient Learning of Deep Networks from Decentralized Data; retrieved from Internet: URL: https://arxov.org/pdf/1602.05629.pdf; 11 pages; dated Feb. 28, 2017.
Zhao et al; Federated Learning with Non-IID Data; ARXIV.org; Cornell University Library; 201 Olin Library Cornell University Ithaca; 13 pages; dated Jun. 2, 2018.
Shoham et al.; Overcoming Forgetting in Federated Learning on Non-IIC Data; ARXIV.org; Cornell University Library; 201 Olin Library Cornell University Ithaca; 12 pages; dated Oct. 17, 2019.
Huang et al.; Federated learning with auxiliary generator; Spie Proceeding; vol. 11584; 6 pages; dated Nov. 10, 2020.
Chen et al.; Semi-Federated Learning; 2020 IEEE Wireless Communications and Networking Conference; 6 pages; dated May 25, 2020.
European Patent Office; International Search Report and Written Opinion issued in Application No. PCT/US2021/063040; 12 pages; dated Apr. 20, 2022.

\* cited by examiner

MIXED CLIENT-SERVER FEDERATED LEARNING OF MACHINE LEARNING MODEL(S)

BACKGROUND

Federated learning of machine learning (ML) model(s) is an increasingly popular ML technique for training ML model(s). In traditional federated learning, a local ML model is stored locally on a client device of a user, and a global ML model, that is a cloud-based counterpart of the local ML model, is stored remotely at a remote system (e.g., a cluster of servers). The client device, using the local ML model, can process user input detected at the client device to generate predicted output, and can compare the predicted output to ground truth output to generate a client gradient. Further, the client device can transmit the client gradient to the remote system. The remote system can utilize the client gradient, and optionally additional client gradients generated in a similar manner at additional client devices, to update weights of the global ML model. The remote system can transmit the global ML model, or updated weights of the global ML model, to the client device. The client device can then replace the local ML model with the global ML model, or replace the weights of the local ML model with the updated weights of the global ML model, thereby updating the local ML model.

Notably, these global ML models are generally pre-trained at the remote system prior to utilization in federated learning based on a plurality of remote gradients that are generated remotely at the remote system, and without use of any client gradients generated locally at the client devices. This pre-training is generally based on proxy or biased data that may not reflect data that will be encountered when the global ML model is deployed at the client devices. Subsequent to the pre-training, the weights of these global ML models are usually only updated based on client gradients that are generated based on data that is encountered when the global ML model is deployed at the client devices, and without use of any remote gradients generated remotely at the remote system. However, updating the weights of these global ML models in this manner can result in catastrophic forgetting of information learned during pre-training. Further, client gradients generated based on certain data (e.g., false positives, false negatives, etc.) may be difficult to obtain at the client devices, thereby resulting in poor performance of the ML models trained using federated learning.

SUMMARY

Implementations disclosed herein are directed to federated learning of machine learning (ML) model(s) based on gradient(s) generated at corresponding client devices and a remote system. Processor(s) of the corresponding client devices can process client data generated locally at the corresponding client devices using corresponding on-device ML model(s) to generate corresponding predicted outputs, generate corresponding client gradients based on the corresponding predicted outputs, and transmit the corresponding client gradients to the remote system. Processor(s) of the remote system can process remote data obtained from remote database(s) using global ML model(s) to generate additional corresponding predicted outputs, generate corresponding remote gradients based on the additional corresponding predicted outputs. Further, the remote system can utilize the corresponding client gradients and the corresponding remote gradients to update the global ML model(s) or weights thereof. The updated global ML model(s) and/or the updated weights thereof can be transmitted back to the corresponding client devices. Notably, the remote gradients described herein are utilized in updating the global model(s) model that have already been trained.

For example, assume audio data capturing a spoken utterance of "Assistant, call Ron Smith" is generated at a given client device of a user. In this example, the given client device can process, using an on-device hotword detection model, the audio data to generate predicted output indicative of whether a portion of the spoken utterance includes one or more particular words or phrases to invoke an automated assistant (e.g., "Assistant", "Hey Assistant", and/or any other word or phrase to invoke or otherwise control the automated assistant). In this example, the predicted output can be a predicted measure (e.g., probability, binary value, log likelihood value, or any other predicted measure). For instance, assume the predicted output is a probability of 0.80 satisfying a threshold probability (e.g., 0.75) that indicates the spoken utterance includes one or more of the particular words or phrases to invoke the automated assistant. Further, the given client device can compare the predicted output (e.g., the probability of 0.80) to corresponding ground truth output (e.g., a probability of 1.0 assuming the user intended to invoke the automated assistant). The given client device can compare the predicted output and the corresponding ground truth output to generate a client gradient, or, more particularly, a hotword detection client gradient that is associated with the hotword detection model. The hotword detection client gradient can be transmitted to the remote system, and the remote system can utilize the hotword detection client gradient to update weights of a global hotword detection model.

Although the above example is described with respect to a hotword detection client gradient, it should be understood that is for the sake of example and is not meant to be limiting. For example, the given client device can additionally or alternatively process, using an automatic speech recognition (ASR) model, the audio data to generate predicted output associated with terms corresponding to the spoken utterance. In this example, the predicted output can be a plurality of speech hypotheses corresponding to the spoken utterance (and optionally predicted measures associated with one or more of the plurality of speech hypotheses). For instance, assume the predicted output for the "Ron" portion of the spoken utterance includes a term hypotheses of "Ron" associated with a probability of 0.55, and a term hypotheses of "Don" associated with a probability of 0.45. The given client device can compare the predicted output (e.g., the term hypotheses of "Ron" and "Don" and their associated probabilities) to corresponding ground truth output (e.g., the term "Ron" and probability of 1.0 assuming the user intended to call "Ron"). The given client device can compare the predicted output and the corresponding ground truth output to generate another client gradient, or, more particularly, an ASR client gradient that is associated with the ASR model. Similarly, the ASR client gradient can be transmitted to the remote system, and the remote system can utilize the ASR client gradient to update weights of a global ASR model. Moreover, although the above example is described with respect to audio-based ML models, it should also be understood that is for the sake of example and is not meant to be limiting, and that the techniques described herein can also be utilized to generate client gradients for image-based ML models, text-based ML models, and/or other types of ML models. In other words, the types of gradients generated by the given client device may be based on the client data that is generated or received at the given client device, and may additionally or alternatively be based on the particular ML models utilized to process the client data.

The remote system can (and optionally in response to receiving client gradients from the corresponding client devices), obtain the remote data from the remote database(s). In some implementations, the remote data can be obtained, for example, from an online video-sharing platform, image-sharing platform, audio-sharing platform, and/or text-based platform that is not access-restricted (i.e., like the client data generated and/or received locally at the corresponding client devices). In additional or alternative implementations, and with permission of corresponding users of the corresponding client devices, the remote data can be data that is access-restricted data of the corresponding users that is accessible to the remote system. The remote gradients can be generated at the remote system in the same or similar manner described above with respect to the given client device, but generated based on the remote data and using components of the remote system and the global ML model(s) that are accessible to the remote system.

In some implementations, the remote system can analyze the client gradients that are received from the corresponding client devices and obtain remote data that is associated with the client data. For example, assume a given client gradient is generated based on audio data capturing the spoken utterance of "Assistant, call Ron Smith", but the automated assistant was not invoked based on the predicted output (e.g., a false negative hotword detection client gradient). In this example, the remote system can obtain remote audio data that may result in another false negative (e.g., by filtering the remote audio date to mumble or otherwise affect "Assistant"). Notably, in the federated learning framework, the client gradient may be transmitted to the server, without transmitting any of the underlying client data or predicted outputs. However, the remote system may know that the gradient is a false negative hotword detection client gradient generated based on audio data. In contrast, the remote system can obtain remote audio data that may result in a false positive (e.g., the automated assistant was invoked, but it should not have been invoked), which may be more difficult to obtain than false negatives since an intent of a user of the given client device may not be readily ascertainable. Nonetheless, the remote system can obtain remote audio data that may result in a false positive to ensure the gradients utilized to update a global hotword detection model are sufficiently diverse.

In some versions of those implementations, the remote system can analyze a distribution of gradients to be utilized in updating corresponding global ML model(s). In analyzing the distribution, the remote system can identify the types of client gradients that have been received at the remote system from the corresponding client devices and/or the types of remote gradients that have been generated at the remote system. Further, the remote system can determine there is a need to generate a particular type of gradient based on the distribution of gradients lacking particular types of gradients or a sufficient quantity thereof. In response to determining there is a need to generate these particular types of gradients, the remote system can generate those particular types of gradients (and optionally a particular quantity thereof). For example, assume a plurality of hotword free invocation client gradients have been generated at the corresponding client devices based on gestures provided by corresponding users of the corresponding client devices to invoke or otherwise control the automated assistant (e.g., based on hand movement, eye movement, lip movement, etc.). However, it may be difficult at the client device to obtain hotword free invocation client gradients that do not invoke the automated assistant (e.g., due to privacy considerations). In this example, the remote system may determine there is a need for hotword free invocation remote gradients that include humans making gestures that are not directed to invoking the automated assistant. Accordingly, the remote system can obtain remote image data of a human making one or more gestures that do not invoke the automated assistant to ensure there is sufficient quantity and diversity amongst the hotword free invocation gradients utilized to update a global hotword free invocation model.

Further, the remote system can utilize the client gradients received from the corresponding client devices and the remote gradients generated by the remote system to update the corresponding global ML model(s). In some implementations, the remote system can select a set of corresponding client gradients to be utilized in updating weights of corresponding global ML model(s) for specific iterations of updating. In some versions of those implementations, the remote system can select the corresponding set of client gradients based on one or more criteria. The one or more criteria can include, for example, the types of client gradients available to the remote system, a threshold quantity of client gradients available to the remote system, a threshold duration of time of updating using the client gradients, and/or other criteria. For example, the remote system can select a set of 500 audio-based client gradients to be utilized to update audio-based model(s) (e.g., a single audio-based model or multiple disparate audio-based models), select a set of 200 hotword client gradients to be utilized to update hotword model(s), and so on. As another example, the system can select a set of 600 image-based client gradients to be utilized to update image-based model(s) (e.g., a single image-based model or multiple disparate image-based models), select a set of 300 hotword free invocation client gradients to be utilized to update hotword model(s), and so on. In other implementations, the set of client gradients can include any combination of audio-based client gradients, image-based client gradients, text-based client gradients, and/or any other types of client gradients (or particular types of client gradients).

In some versions of those implementations, the remote system can also select a set of corresponding remote gradients to be utilized in updating weights of a corresponding global ML model. In some further versions of those implementations, the remote system can select the set of corresponding remote gradients based on a type of gradient included in the set of corresponding client gradients. For example, if the selected set of corresponding client gradients includes a set of audio-based gradients (or a particular type of audio-based gradient), the selected set of corresponding remote gradients can also include audio-based gradients. In additional or alternative versions of those further implementations, the remote system can select the set of corresponding remote gradients based on a quantity of the client gradients included in the selected set of corresponding client gradients. For example, if the selected set of corresponding client gradients includes a set of 500 audio-based gradients (or a particular type of audio-based gradient), the selected set of corresponding remote gradients can also include 500 audio-based gradients. As another example, if the selected set of corresponding client gradients includes a set of 500 audio-based gradients (or a particular type of audio-based gradient), the selected set of corresponding of remote gradients can also include a proportional quantity of audio-based gradients (e.g., 750 for 150%, 250 for 50%, 100 for 20%, etc.).

In implementations where corresponding sets of client gradients and remote gradients are utilized to update the weights of the corresponding global ML model(s), the corresponding global ML model(s) can be updated in various manners. For example, the weights of the corresponding ML model(s) can be initially updated based on the selected set of the corresponding client gradients, and subsequently updated based on the selected set of the corresponding remote gradients. As another example, the weights of the corresponding ML model(s) can be initially updated based on the selected set of the corresponding remote gradients, and subsequently updated based on the selected set of the corresponding client gradients. As yet another example, first weights of first instance(s) of the corresponding ML model(s) can be updated based on the selected set of the corresponding client gradients, and, in a parallel or serial manner, second weights of second instance(s) of the corresponding ML model(s) can be updated based on the selected set of the corresponding remote gradients. In this example, an average of the first weights and the second weights (or some other statistical measure) can be utilized as the updated weights of the corresponding ML models. In other implementations, the remote system can utilize the client gradients and the remote gradients to update the corresponding global ML model(s) in a first in, first out (FIFO) manner without assigning the gradients to specific iterations of updating the global ML model(s).

By using the techniques described herein, various technical advantages can be achieved. As one non-limiting example, in utilizing both the client gradients and the remote gradients generated in the manner described herein, the corresponding global ML models can be updated based on diverse and well-balanced data, thereby reducing the effects of catastrophic forgetting and resulting in more robust global ML models that have greater precision and/or recall. For example, the remote system can generate the remote gradients based on an identified need for particular types of gradients for particular global ML models that, absent these techniques, may not be obtainable within the federated learning framework due to privacy considerations. As a result, when the corresponding global ML models (or weights thereof) are deployed to client devices, the on-device ML models are also more robust and have greater precision and/or recall.

The above description is provided as an overview of some implementations of the present disclosure. Further description of those implementations, and other implementations, are described in more detail below.

DETAILED DESCRIPTION

Figure 1A:
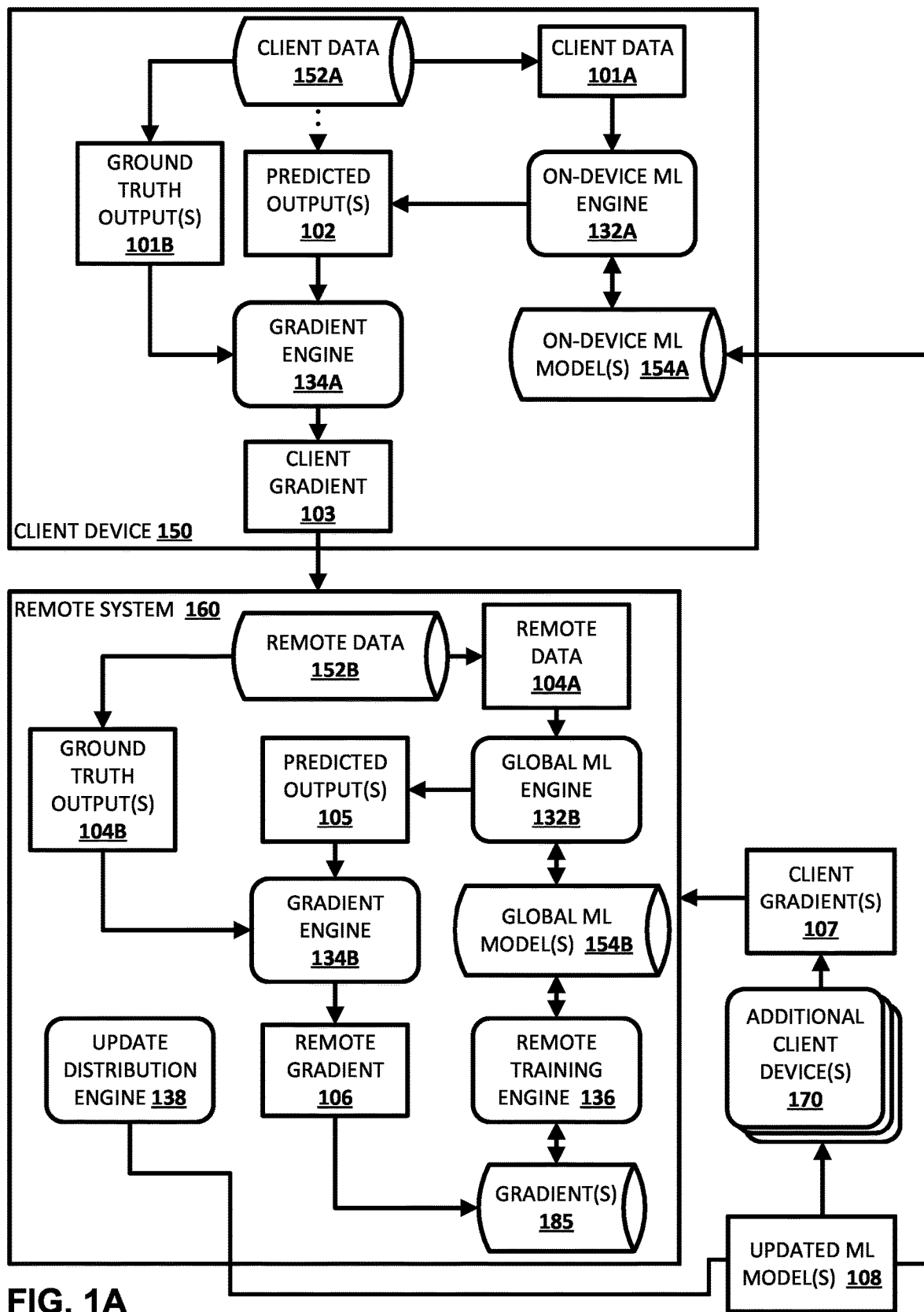
FIGS. 1A, 1B, 1C, and 1D depict example process flows that demonstrate various aspects of the present disclosure, in accordance with various implementations.

FIGS. 1A-1D depict example process flows that demonstrate various aspects of the present disclosure. A client device 150 is illustrated in FIG. 1A, and includes the components that are encompassed within the box of FIG. 1A that represents the client device 150. On-device machine learning (ML) engine 132A can process client data 101A, using on-device ML model(s) stored in on-device ML model(s) database 154A, to generate predicted output(s) 102. Gradient engine 134A can generate a client gradient 103 based on the predicted output(s) 102. In some implementations, the gradient engine 134A can generate the client gradient 103 based on comparing the predicted output(s) 102 to ground truth output(s) 101B corresponding to the client data 101A using supervised learning techniques. In additional or alternative implementations, such as when the ground truth output(s) 101B corresponding to the client data 101A are unavailable, the gradient engine 134A can generate the client gradient 103 using supervised and/or unsupervised learning techniques (e.g., described with respect to FIG. 3). The client device 150 can then transmit the client gradient 103 to a remote system 160 over one or more networks (e.g., any combination of local area networks (LANs), wide area networks (WANs), and/or any other type of network), and optionally without transmitting any of the client data 101A, the ground truth output(s) 101B, the predicted output(s) 102, and/or any other personally identifiable information. In various implementations, the client device 150 can transmit the client gradient 103 to the remote system 160 response to determining one or more conditions are satisfied (e.g., described with respect to FIG. 3).

In some implementations, the client gradient 103 (and other gradients described herein) may be derived from a loss function used to train the ML model(s), such that the gradient represents a value of that loss function (or a derivative thereof) obtained from comparison of the ground truth output(s) 101B to the predicted output(s) 102 (e.g., using supervised learning techniques). For example, when the ground truth output(s) 101B and the predicted output(s) 102 match, the gradient engine 134A can generate a zero gradient. Also, for example, when the ground truth output(s) 101B and the predicted output(s) 102 do not match, the gradient engine 134A can generate a non-zero gradient that is optionally dependent on the extent of the mismatching. The extent of the mismatching can be based on an extent of mismatching between deterministic comparisons of the ground truth output(s) 101B and the predicted output(s) 102. In additional or alternative implementations, the client gradient 103 (and other gradients described herein) may be derived from a loss function used to train the ML model(s), such that the gradient represents a value of that loss function (or a derivative thereof) determined based on the predicted output(s) 102 (e.g., using supervised or semi-supervised learning techniques).

As described below, the client data 101A can be audio data generated by microphone(s) of the client device 150 (e.g., described with respect to FIG. 1B), textual segment(s)

provided as input by a user of the client device 150 and/or stored in on-device memory (e.g., described with respect to FIG. 1C), image data generated by vision component(s) of the client device (e.g., described with respect to FIG. 1D), and/or any other data that is generated locally at the client device 150 and processed using ML model(s). In some implementations, the client data 101A can be processed to generate the gradient 103 when the client data 101A is generated or provided to the client device 150 in a synchronous manner. In additional or alternative implementations, the client data 101A can be stored in client data database 152A when the client data 101A is generated or provided to the client device 150, and the client data 101A can be subsequently utilized to generate the gradient 103 in an asynchronous manner. In additional or alternative implementations, the on-device ML engine 132A can process the client data 101A to generate the predicted output(s) 102, the predicted output(s) 102 can be stored in the client data database 152A (optionally in association with the client data 101A associated with the predicted output(s) 102), and the predicted output(s) 102 can be subsequently utilized to generate the gradient 103 in an asynchronous manner. The client device database 152A (also referred to herein as on-device memory or on-device storage) can include any data generated or provided to the client device including, but not limited to, audio data, image data, contact lists, electronic messages (e.g., text messages, emails, social media messages, etc.) sent by a user of the client device 150 or received by the user of the client device 150, and/or any other client data. Notably, the client data 101A corresponds to access-restricted data, or data that is not publicly available and/or available to the remote system 160.

Global ML engine 132A can process remote data 104A, using global ML model(s) stored in global ML model(s) database 154B, to generate predicted output(s) 105. The remote data 104A can be obtained from remote data database 152B. The remote data database 152B can include any data that is accessible by the remote system 160 including, but not limited to, public data repositories that include audio data, textual data, and/or image data, and private data repositories. Further, the remote data database 152B can include data from different types of client devices that have different device characteristics or components (e.g., that differ from the client device 150 and/or a plurality of additional client devices 170 described below). For example, the remote data database 152B can include audio data captured by near-field microphone(s) (e.g., similar to audio data captured by the client device 150) and audio data captured by far-field microphone(s) (e.g., audio data captured by other devices). As another example, the remote data database 152B can include image data (or other vision data) captured by different vision components, such as RGB image data, RGB-D image data, CMYK image data, and/or other types of image data captured by various different vision components. Moreover, the remote system 160 can employ one or more techniques to the remote data 104A to modify the remote data 104B. These techniques can include filtering audio data to add or remove noise when the remote data 104A is audio data, blurring images when the remote data 104A is image data, and/or other techniques to manipulate the remote data 104A. This allows the remote system 160 to better reflect client data generated by a plurality of different client devices and/or satisfy a need for a particular type of data (e.g., induce false positives or false negatives as described herein, ensure sufficient diversity of audio data as described herein, etc.).

Gradient engine 134B can generate a remote gradient 106 based on the predicted output(s) 105. In some implementations, the gradient engine 134B can generate the remote gradient 106 based on comparing the predicted output(s) 105 to ground truth output(s) 104B corresponding to the remote data 104A using supervised learning techniques. In additional or alternative implementations, such as when the ground truth output(s) 104B corresponding to the remote data 104A are unavailable, the gradient engine 134B can generate the remote gradient 106 using supervised and/or unsupervised learning techniques. In some implementations, the remote system 160 can simulate client devices as "canary" users such that it appears the remote gradient 106 is being generated by an actual client device. The remote gradient 106 (and any additional remote gradients) can be stored in gradient(s) database 185 (e.g., long-term memory and/or short-term memory, such as a buffer), and optionally along with the client gradient 103 received from the client device 150 and corresponding additional gradients 107 received from a plurality of additional client devices 170 (and optionally may be restricted to client devices of the same type as the client device 150 (e.g., mobile phone, standalone interactive speaker, in-vehicle computing systems, etc.)). The additional gradients 107 received from the plurality of additional client devices 170 can each be generated based on the same or similar technique as described above with respect to generating the gradient 103, but on the basis of locally generated or provided client data at a respective one of the plurality of additional client devices 170.

As noted above, the gradients 103, 106, and/or 107 can be stored in the gradient(s) database 185 (or other memory (e.g., a buffer)) as the gradients 103, 106, and/or 107 are generated and/or received. In some implementations, the gradients 103, 106, and/or 107 can indexed by type of gradient, from among a plurality of different types of gradients, that is determined based on the corresponding on-device ML model(s) that processed the client data 101A and/or the corresponding global ML model(s) that processed the remote data 104A. The plurality of disparate types of gradients can be defined with varying degrees of granularity. For example, as described with respect to FIGS. 1B-1C and 2, the types of gradients can be particularly defined, for example, hotword gradients generated based on processing audio data using hotword model(s), ASR gradients generated based on processing audio data, VAD gradients generated based on processing audio data using VAD model(s), continued conversation gradients generated based on processing audio data using continued conversation model(s), voice identification gradients generated based on processing audio data using voice identification model(s), face identification gradients generated based on processing image data using face identification model(s), hotword free gradients generated based on processing image data using hotword free model(s), object detection gradients generated based on processing image data using object detection model(s), text-to-speech (TTS) gradients generated based on processing textual segments using TTS model(s), and/or any other gradients that may be generated based on processing data using any other ML model. Notably, a given one of the gradients 103, 106, and/or 107 can belong one to one of the multiple different types of gradients. Accordingly, as another example, the types of gradients can be more generally defined as, for example, audio-based gradients generated based on processing audio data using one or more audio-based models, image-based gradients generated based on processing image data using one or more image-based models, or text-based gradients generated based on processing textual segments using text-based models.

Remote training engine 136 can utilize at least the client gradient 103, the remote gradient 106 and the additional gradients 107, to update one or more weights of the global ML model(s) stored in the global ML model(s) database 154B. For example, the remote training engine 136 can identify particular global ML model(s), of the global ML model(s) stored in the global ML model(s) database 154B, to update weights thereof. In some implementations, the remote training engine 136 can identify the particular global ML model based on the type of gradients that are stored in the gradient(s) database 185. For example, if a plurality of hotword gradients are stored in the gradient(s) database 185, the remote training engine 136 can identify global hotword model(s) for updating based on the plurality of hotword gradients. As another example, if a plurality of audio-based gradients are stored in the gradient(s) database 185, the remote training engine 136 can identify global audio-based model(s) for updating based on the plurality of audio-based gradients. Notably, the remote training engine 136 can identify a single global ML model to be updated at a given time instance or multiple global ML models to be updated, in parallel, at the given time instance.

In some implementations, the remote system 160 can assign the gradients 103, 106, and/or 107 to specific iterations of updating the global ML model(s) based on one or more criteria. The one or more criteria can include, for example, the types of gradients available to the remote training engine 136, a threshold quantity of gradients available to the remote training engine 136, a threshold duration of time of updating using the gradients, and/or other criteria. In particular, the remote training engine 136 can identify multiple sets or subsets of gradients generated by the client devices 110 and/or sets generated by the remote system 160. Further, the remote training engine 136 can update the global ML model(s) based on these sets or subsets of the gradients. In some further versions of those implementations, a quantity of gradients in the sets of client gradients and sets of remote gradients be the same or vary (e.g., proportional to one another and having either more client gradients or more remote gradients). In yet further versions of those implementations, each of the subsets of client gradients can optionally include client gradients from at least one unique client device that is not included in another one of the subsets. In other implementations, the remote system 160 utilize the client gradients and the remote gradients to update corresponding global ML model(s) in a first in, first out (FIFO) manner without assigning the gradients 103, 106, and/or 107 to specific iterations of updating the global ML model(s). Utilizing the gradients 103, 106, and/or 107 to update the ML model(s) is described herein (e.g., with respect to FIGS. 4 and 5)

Update distribution engine 138 can transmit updated ML model(s) 108 and/or weights thereof to the client device 150 and/or one or more of the plurality of additional client devices 170. In some implementations, the update distribution engine 138 can transmit updated ML model(s) 108 and/or weights thereof responsive to one or more conditions being satisfied for the client device 150, one or more of the plurality of additional client devices 170, and/or the remote system (e.g., as described with respect to FIGS. 3 and 4). Upon receiving the update ML model(s) and/or the weights thereof, the client device, the client device can replace corresponding on-device ML model(s) with the updated ML model(s) 108, or replace weights of the corresponding on-device ML model(s) with the weights of the updated ML model(s) 108 (e.g., in the on-device ML model(s) database 154A). Further, the client device 150 may subsequently use the update ML model(s) 108 and/or the weights thereof to make predictions based on further user input detected at the client device 150 (e.g., as described in greater detail with respect to FIG. 2). The client device 150 and the plurality of additional client devices 170 can continue generating further client gradients in the manner described herein and transmitting the further client gradients to the remote system 160. Further, the remote system 160 can continue generating further remote gradients in the manner described herein and updating the global ML model(s) based on the further client gradients and the further remote gradients.

Figure 1B:
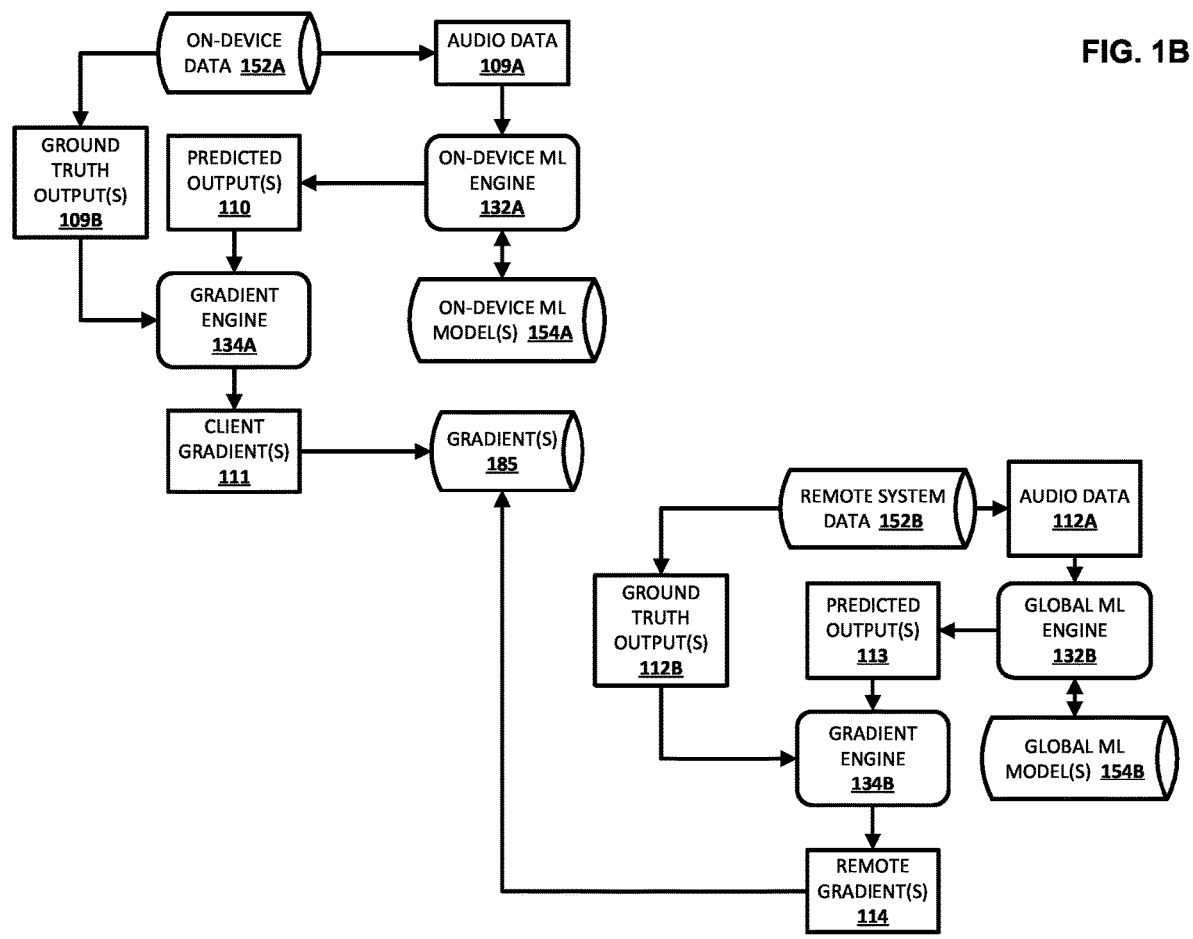

In some implementations, and turning now to FIG. 1B, the client data 101A can be audio data 109A generated by microphone(s) of the client device 150. The audio data 109A can capture, for example, a spoken utterance of a user directed to the client device 150, environmental noise of an environment in which the client device 150 is located such as ambient noise or ambient conversations, and/or any other sound that can be captured by the microphone(s) of the client device 150. In implementations where the client device 101A is audio data 109A, the on-device ML engine 132A can process, using one or more on-device audio-based ML models, the audio data 109A to generate predicted output(s) 110 that are utilized to generated audio-based client gradients. For example, the on-device ML engine 132A can process the audio data 109A using: an on-device voice activity detection (VAD) model to predict whether the audio data 109A captures a spoken utterance of a human; an on-device hotword detection model to predict whether the audio data 109A captures a spoken utterance that includes one or more particular words or phrases that invoke or otherwise cause an automated assistant to control the client device 150 or other devices (e.g., other client devices or smart devices); an on-device automatic speech recognition (ASR) model to generate recognized text based on any spoken utterances captured in the audio data 109A; an on-device voice identification model can process the audio data 109A to determine whether any spoken utterance captured in the audio data 109A originated from a particular user (e.g., a user of the client device 150); an on-device continued conversation model can process the audio data 109A to determine whether the audio data 109A captures follow-up input provided by a user of the client device 150; an on-device endpoint model can process the audio data 109A to predict whether and/or when a user providing a spoken utterance is finished with the spoken utterance; and/or any other on-device audio-based ML model. It should be understood that the aforementioned on-device ML model(s) are provided for the sake of example, and not meant to be limiting.

Notably, the predicted output(s) 110 can include a corresponding predicted output generated across one or more of the aforementioned on-device ML model(s). For example, if the audio data 109A is processed using the on-device VAD model and the on-device hotword detection model, then predicted output(s) 110 can include a corresponding predicted output associated with the on-device VAD model and corresponding predicted output associated with the on-device hotword detection model. As another example, if the audio data 109A is processed using the on-device voice identification model, the on-device hotword detection model, and the on-device ASR model, then the predicted output(s) 110 can include a corresponding predicted output associated with the on-device voice identification model, corresponding predicted output associated with the on-device hotword detection model, and corresponding predicted output associated with the on-device ASR model. Accordingly, the predicted output(s) 110 can include predicted output generated across one or more of the on-device ML models. Accordingly, any resulting client gradients can be of a particular type of gradient based on the on-device ML model(s) utilized to process the audio data 109A.

Figure 3:
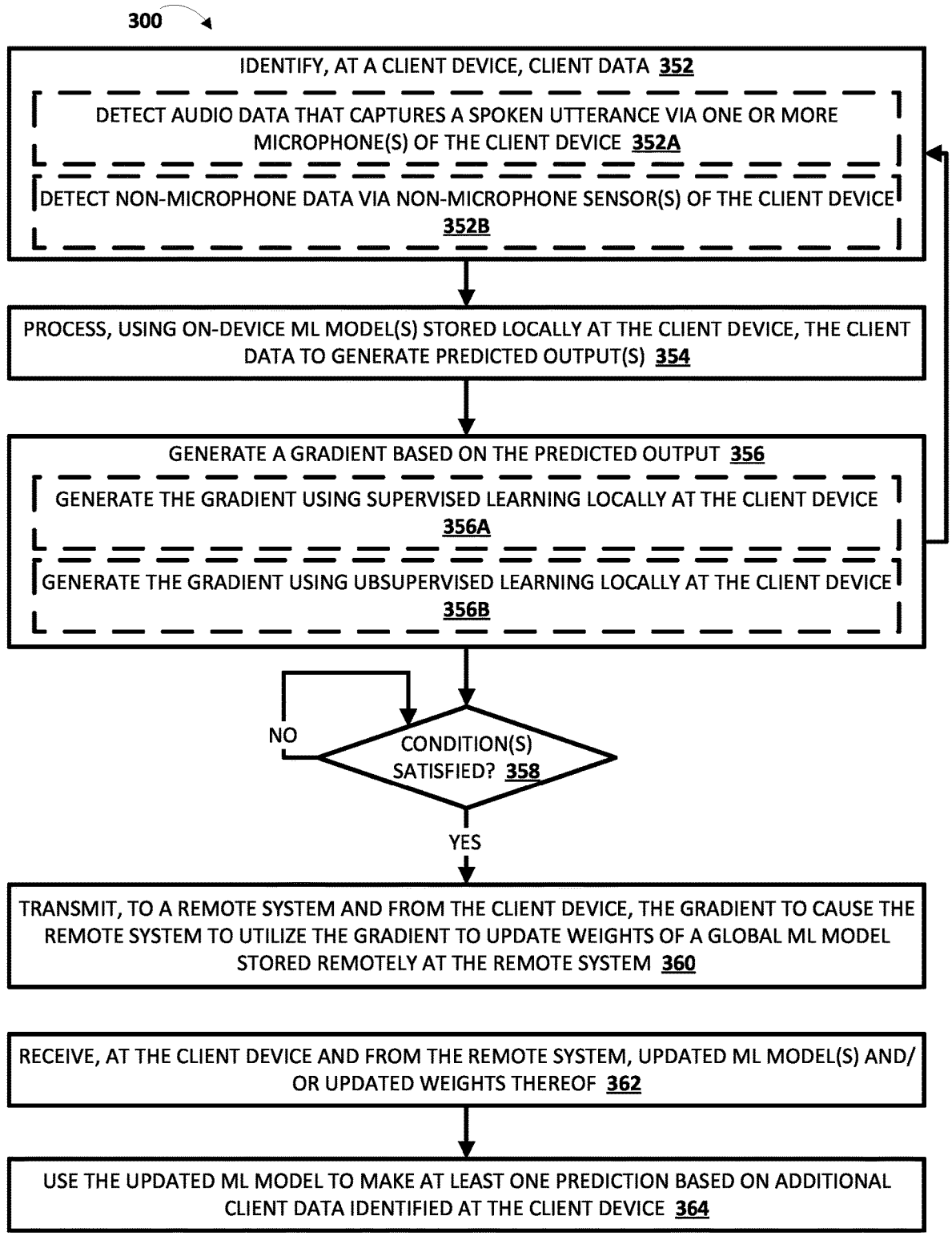
FIG. 3 depicts a flowchart illustrating an example method of generating client gradient(s) locally at a client device to be utilized in updating machine learning model(s), in accordance with various implementations.

In some implementations, the gradient engine 134A can compare the predicted output(s) 110 to corresponding ground truth output(s) 109B to generate client gradient(s) 111 using supervised learning techniques (e.g., as described with respect to FIG. 3). In additional or alternative implementations, such as when the corresponding ground truth output(s) 109B are not available, the gradient engine 134A can utilize unsupervised learning techniques to generate the client gradient(s) 111 (e.g., as described with respect to FIG. 3). In other words, the gradient engine 134A can evaluate the predicted output(s) 110 with respect to some actual output that should have been generated across the model to identify errors generated across the on-device ML model(s). For example, assume predicted output generated across the on-device hotword recognition model is a probability (e.g., or other predicted measures, such as a log likelihood, binary value, or other measure) that is indicative of whether the audio data 109A includes a particular word or phrase to invoke an automated assistant. Further assume the probability is 0.75, and a threshold probability for invoking the automated assistant is 0.80. In this example, the automated assistant may not be invoked. However, further assume that the automated assistant is invoked within a threshold period of time of receiving the audio data 109A. The client device 150 can utilize this as a supervision signal to indicate that the automated assistant should have been invoked in response to receiving the spoken utterance captured in the audio data 109A (e.g., a false negative). In this example, the corresponding ground truth output can be a probability of 1.0 to indicate that the automated assistant should have been invoked, and the resulting client gradient can be false negative gradient for hotword detection model(s).

Further, the client gradient(s) 111 can be transmitted to the remote system 160, and stored in the gradient(s) database 185. The remote data 104A can be audio data 112A obtained from the remote system data database 152B. The remote system 160 can cause the audio data 112A to be processed in the same or similar manner described above with respect to the client device 150 to generate predicted output(s) 112, but using the global ML engine 132B and corresponding audio-based global ML model(s) stored in the global ML model(s) database 154B. Further, the gradient engine 134B can compare the predicted output(s) 113 to corresponding ground truth output(s) 112B to generate audio-based remote gradient(s) 114, and the remote gradient(s) 114 can be stored in the gradient(s) database 185.

Figure 1C:
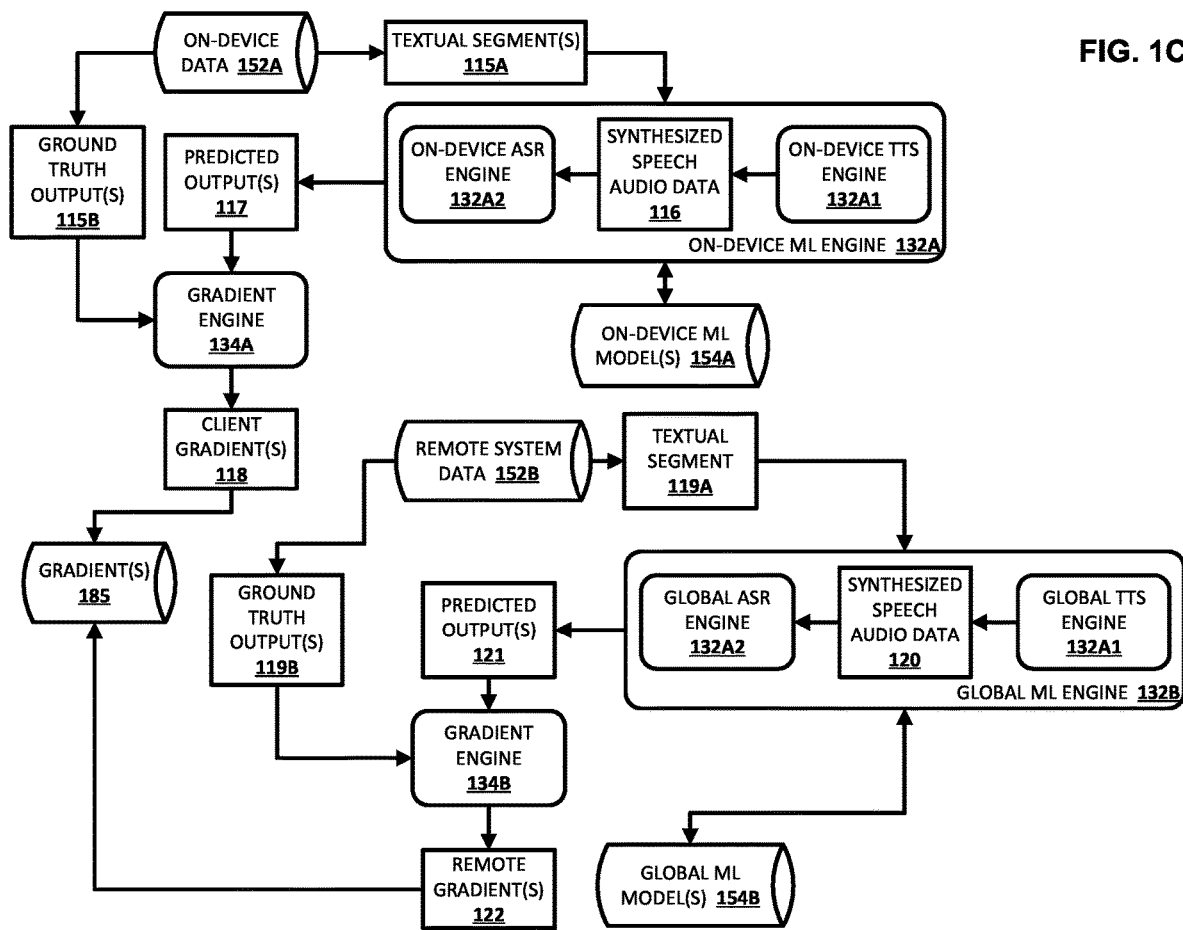

In additional or alternative implementations, and turning now to FIG. 1C, the client data 101A can be textual segment(s) 115A that are accessible to the client device 150. The textual segment(s) 115A can include any text that is available to the client device 150. For example, the textual segment(s) 115A can include one or more terms retrieved from a list of contacts (e.g., names, physical addresses, email addresses, and/or other contact information), messages (e.g., text messages, email messages, and/or any other electronic message), calendar or task entries, documents, reminders, and/or other text that is available at the client device 150. In implementations where the client device 101A is textual segment(s), the on-device ML engine 132A can process, using one or more on-device text-based ML models, the textual segment(s) 115A to generate predicted output(s) 117 that are utilized to generated text-based client gradients. For example, the on-device ML engine 132A can cause an on-device TTS engine 132A1 to process, using an on-device TTS model stored in the on-device ML model(s) database 154A, the textual segment(s) 115A to generate synthesized speech audio data 116 that includes synthesized speech corresponding to the textual segment(s) 115A. Further, the on-device ML engine 132A can cause an on-device ASR engine 132A2 to process, using an on-device ASR model stored in the on-device ML model(s) database 154A, the synthesized speech audio data 116 to generate predicted output(s) 117.

In some implementations, the on-device ASR model can be an end-to-end model used to generate predicted text on a character-by-character basis (or another token-by-token basis). One non-limiting example of such an end-to-end model used to generate predicted text on a character-by-character basis is a recurrent neural network transducer (RNN-T) model. An RNN-T model is a form of sequence-to-sequence model that does not employ attention mechanisms. Unlike most sequence-to-sequence models, which typically need to process the entire input sequence (e.g., an audio data waveform, or mel-frequency cepstral coefficients (MFCCs) or other representation) to produce an output the predicted textual segment(s) as the predicted output(s) 116, an RNN-T model can be used to continuously process input samples and stream output symbols (e.g., characters of the alphabet). In other implementations, the on-device ASR model is not an end-to-end speech recognition model. In those other implementations, the on-device ASR engine 132A2 can instead generate predicted phonemes (and/or other representations). For instance, with such models the predicted phonemes (and/or other representations) are then utilized by the on-device ASR engine 132A2 to determine predicted textual segment(s) that conform to the sequence of phonemes as the predicted output(s) 117. In doing so, the on-device ASR engine 132A2 can optionally employ a decoding graph, a lexicon, and/or other resource(s).

Notably, the predicted output(s) 117 in the example of FIG. 1C can include a plurality of speech hypotheses for the textual segment(s) 115A generated across the on-device ASR model, and/or the synthesized speech audio data 116 (and/or acoustic features thereof). For example, if the textual segment(s) 115A processed using the on-device ML engine 132A corresponds to textual segments of "Ron Smith" that was obtained as a name associated with a contact entry of the client device. In this example, the on-device TTS engine 132A1 can process the textual segments to generate synthesized speech audio data that includes synthesized speech corresponding to the contact entry of "Ron Smith". Further, the synthesized speech (or acoustic features thereof) corresponding to "Ron Smith" can be utilized as the predicted output(s) 117 and subsequently utilized in generating a text-based gradient for updating the on-device TTS model, and the plurality of speech hypotheses can be utilized as the predicted output(s) 117 and subsequently utilized in generating an ASR gradient for updating the on-device ASR model. For example, the gradient engine 134A can compare acoustic features (e.g., mel-filterbank features, audio waveforms, prosodic properties, MFCCs, and/or other acoustic features) of the synthesized speech corresponding to "Ron Smith" to audio data of a spoken utterance of "Ron Smith" provided by the user of the client device 150 (e.g., the corresponding ground truth output(s) 115B) to generate a text-based client gradient(s) 118. Further, the gradient engine 134A can compare the plurality of speech hypotheses for "Ron Smith" to the actual textual segments of "Ron Smith" 110 (e.g., the corresponding ground truth output(s) 115B) to generate ASR client gradient(s) 118.

Further, the client gradient(s) 118 can be transmitted to the remote system 160, and stored in the gradient(s) database 185. The remote data 104A can be textual segment(s) 119A obtained from the remote system data database 152B. The remote system 160 can cause the textual segment(s) 112A to be processed in the same or similar manner described above with respect to the client device 150 to generate predicted output(s) 121, but using the global ML engine 132B (e.g., global TTS engine 132A1 to generate synthesized speech audio data 120, and global ASR engine 132A2 to generate predicted textual segments as a portion of the predicted output(s) 121) and corresponding audio-based global ML model(s) stored in the global ML model(s) database 154B. Further, the gradient engine 134B can compare the predicted output(s) 121 to corresponding ground truth output(s) 119B to generate remote gradient(s) 122, and the remote gradient(s) 122 can be stored in the gradient(s) database 185.

Figure 1D:
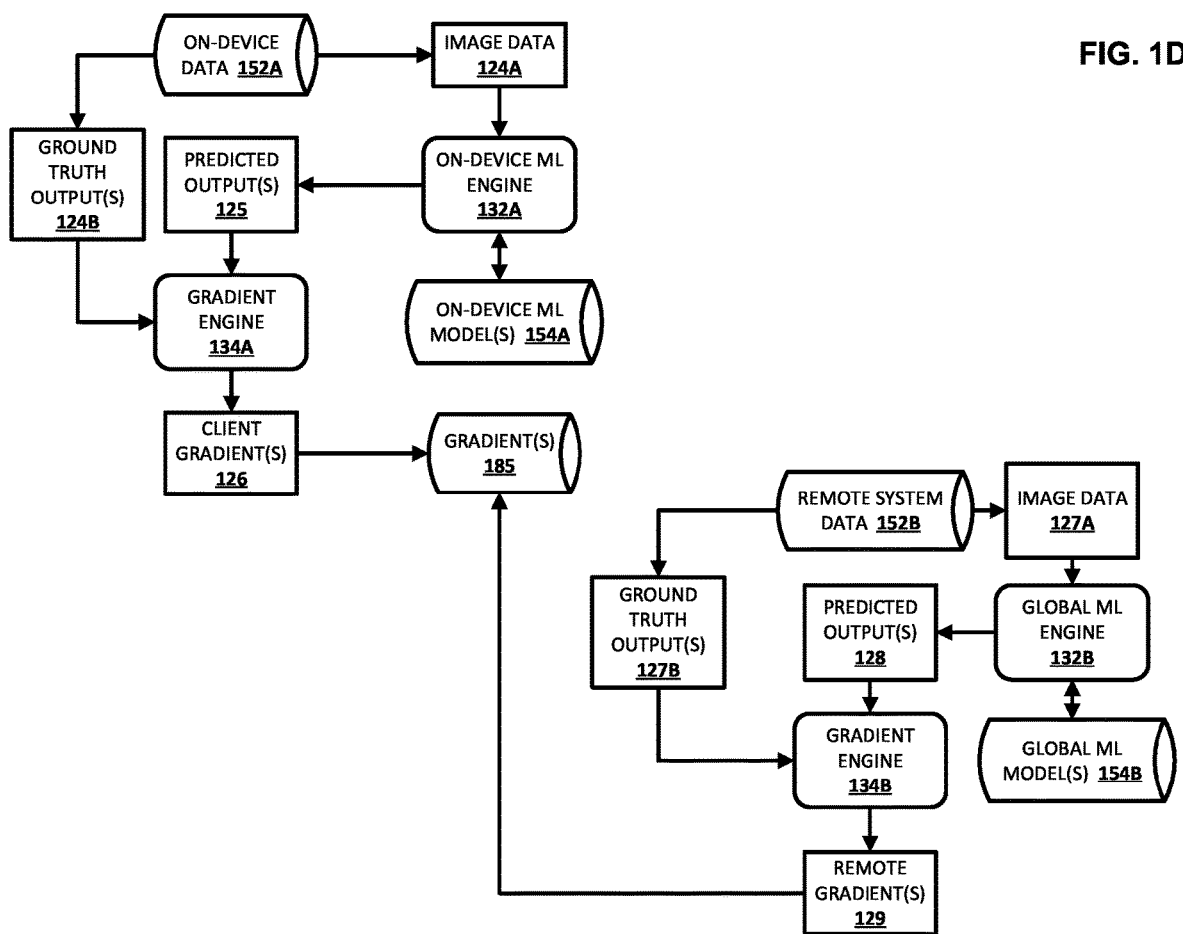

In additional or alternative implementations, and turning now to FIG. 1D, the client data 101A can be image data 124A generated by vision component(s) of the client device 150. The image data 124A can capture, for example, one or more portions of an environment in which the client device 150, including humans, objects, and/or anything else in the environment that can be captured in the image data 124A. Although referred to as image data, it should be understood that this may include still images and sequences of images (e.g., video). In implementations where the client device 101A is image data 124A, the on-device ML engine 132A can process, using one or more on-device image-based ML models, the image data 124A to generate predicted output(s) 125 that are utilized to generated image-based client gradients. For example, the on-device ML engine 132A can process the image data 124A using: an on-device object detection model can process the image data 124A to detect objects or features thereof captured in the environment of the client device 150; an on-device object classification model can process the image data 124A to predict classification(s) of objects captured in the environment of the client device 150; an on-device face identification model can process the image data 124A to determine whether any human captured in the environment corresponds to a particular user (e.g., a user of the client device 150); and/or any other on-device image-based ML model. It should be understood that the aforementioned on-device ML model(s) are provided for the sake of example, and not meant to be limiting.

Notably, the predicted output(s) 110 can include a corresponding predicted output generated across one or more of the aforementioned on-device ML model(s). For example, if the image data 109A is processed using the on-device object detection model and the on-device object classification model, then predicted output(s) 125 can include a corresponding predicted output associated with the on-device object detection model and corresponding predicted output associated with the on-device object classification model. Accordingly, the predicted output(s) 125 can include predicted output generated across one or more of the on-device ML models. Accordingly, any resulting client gradients can be of a particular type of gradient based on the on-device ML model(s) utilized to process the image data 124A.

In some implementations, the gradient engine 134A can compare the predicted output(s) 125 to corresponding ground truth output(s) 124B to generate client gradient(s) 126 using supervised learning techniques (e.g., as described with respect to FIG. 3). In additional or alternative implementations, such as when the corresponding ground truth output(s) 124B are not available, the gradient engine 134A can utilize unsupervised learning techniques to generate the client gradient(s) 126 (e.g., as described with respect to FIG. 3). In other words, the gradient engine 134A can evaluate the predicted output(s) 125 with respect to some actual output that should have been generated across the model to identify errors generated across the on-device ML model(s). For example, assume predicted output generated across the on-device hotword recognition model is a probability (e.g., or other predicted measures, such as a log likelihood, binary value, or other measure) that is indicative of whether the image data 124A includes a user associated with the client device 150. Further assume the probability is 0.65, and a threshold probability for classifying the human as the user of the client device 150 is 0.85. In this example, the user of the client device 150 may not be recognized as such. However, further assume that the automated assistant is invoked within a threshold period of time of receiving the image data 124A via another authenticating measure, such as a passcode for the client device 150. The client device 150 can utilize this as a supervision signal to indicate that the human captured in the image data 124A is, in fact, the user of the client device 150 (e.g., a false negative). In this example, the corresponding ground truth output can be a probability of 1.0 to indicate that the image data 124A includes the user of the client device 150, and the resulting client gradient can be false negative gradient for face identification model(s).

Further, the client gradient(s) 126 can be transmitted to the remote system 160, and stored in the gradient(s) database 185. The remote data 104A can be image data 127A obtained from the remote system data database 152B. The remote system 160 can cause the image data 127A to be processed in the same or similar manner described above with respect to the client device 150 to generate predicted output(s) 128, but using the global ML engine 132B and corresponding audio-based global ML model(s) stored in the global ML model(s) database 154B. Further, the gradient engine 134B can compare the predicted output(s) 128 to corresponding ground truth output(s) 127B to generate image-based remote gradient(s) 129, and the remote gradient(s) 129 can be stored in the gradient(s) database 185.

Turning back to FIG. 1A, in various implementations, the remote training engine 136 can analyze a distribution of gradients. In analyzing the distribution, the remote training engine 136 can identify the types of client gradients that have been received at the remote system 160 from the client device 150 and/or the additional client devices 170 and/or the types of remote gradients that have been generated at the remote system 160. Further, the remote training engine 136 can determine there is a need to generate a particular type of gradient based on the distribution of gradients lacking particular types of gradients or a sufficient quantity thereof. In response to determining there is a need to generate these particular types of gradients, the remote training 136 can cause remote system 160 to generate those particular types of gradients (and optionally a particular quantity thereof). For example, assume a plurality of hotword free invocation client gradients have been generated at the client device 150 based on gestures provided by a user of the client device 150 to invoke the automated assistant (e.g., based on hand movement, eye movement, lip movement, etc.). However, it may be difficult at the client device 150 to obtain hotword free invocation client gradients that do not invoke the automated assistant (e.g., due to privacy considerations). In this example, the remote training engine 136 may determine there is a need for gradients that include humans making gestures that are not directed to invoking the automated assistant. Accordingly, the remote system 160 can obtain remote data that is image data of a human making gestures that do not invoke the automated assistant to ensure there is sufficient quantity and diversity amongst the gradients utilized to update the global hotword free invocation model.

In other words, the remote gradients generated at the remote system 160 can serve as a proxy for client data that is difficult to obtain. This data can include, for example, false positives and false negatives for ML models(s) that are trained to make predictions (e.g., hotword detection models, hotword free invocation models, voice identification models, face identification models, and so on). Further, the remote gradients generated at the remote system 160 can be generated based on particular words or phrases identified by the remote training engine 136 that commonly cause problems and errors for various ML model(s) described herein. For example, homophones can cause errors for ASR models and hotword detection models. The remote system 160 can generate remote gradients based on homophonic words or phrases that commonly cause errors in these models to reinforce the ML model(s) and avoid catastrophic forgetting.

By using the techniques described herein, various technical advantages can be achieved. As one non-limiting example, in utilizing both the client gradients and the remote gradients generated in the manner described herein, the corresponding global ML models can be updated based on diverse and well-balanced data, thereby reducing the effects of catastrophic forgetting and resulting in more robust global ML models that have greater precision and/or recall. For example, the remote system can generate the remote gradients based on an identified need for particular types of gradients for particular global ML models that, absent these techniques, may not be obtainable within the federated learning framework due to privacy considerations. As a result, when the corresponding global ML models (or weights thereof) are deployed to client devices, the on-device ML models are also more robust and have greater precision and/or recall.

Figure 2:
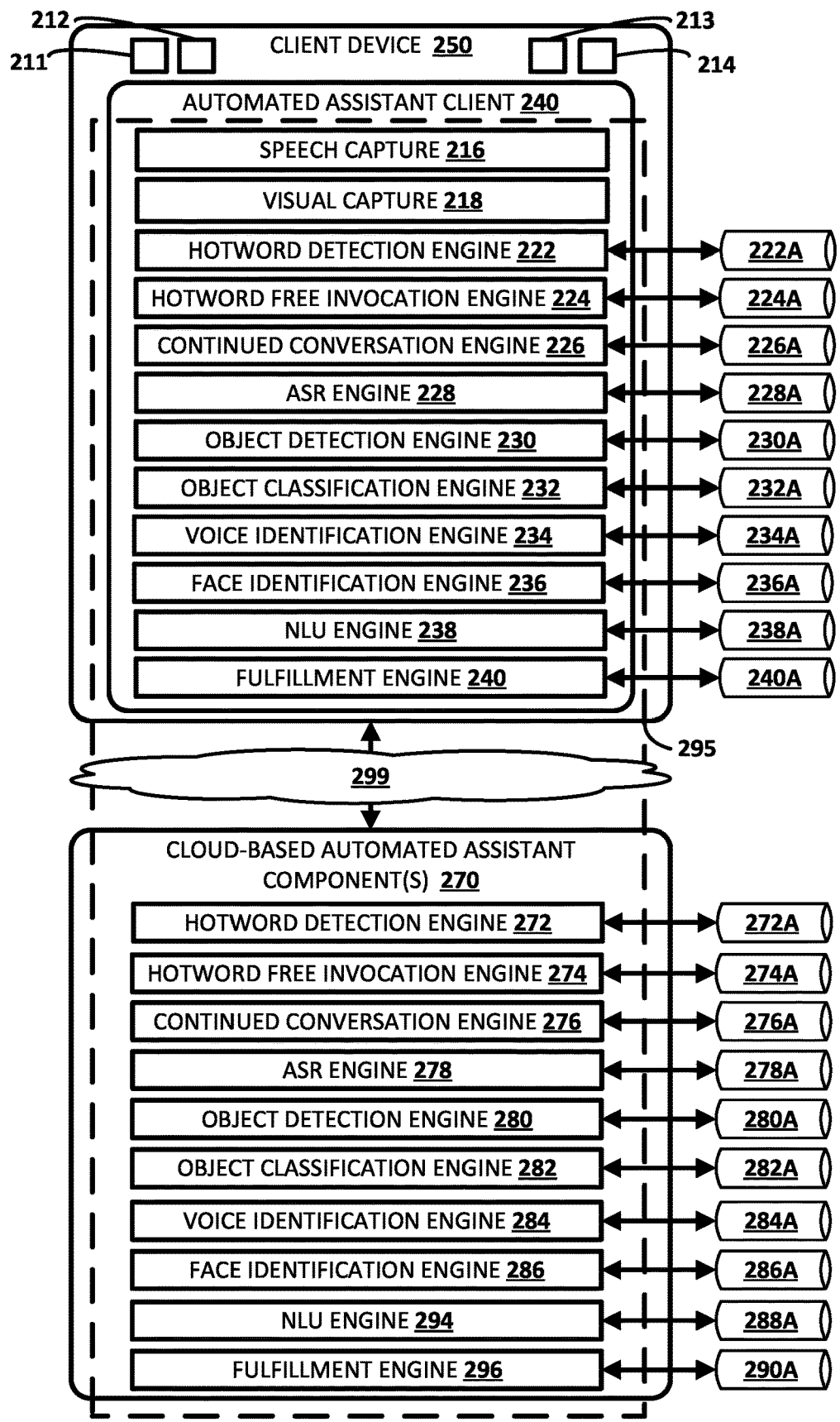
FIG. 2 depicts a block diagram of an example environment in which implementations disclosed herein may be implemented.

Turning now to FIG. 2, a client device 250 is illustrated in an implementation where various on-device ML engines are included as part of (or in communication with) an automated assistant client 240 is depicted. The respective ML models are also illustrated interfacing with the various on-device ML engines. Other components of the client device 250 are not illustrated in FIG. 2 for simplicity. FIG. 2 illustrates one example of how the various on-device ML engines of and their respective ML models can be utilized by the automated assistant client 240 in performing various actions.

The client device 250 in FIG. 2 is illustrated with one or more microphones 211, one or more speakers 212, one or more vision components 213, and display(s) 214 (e.g., a touch-sensitive display). The client device 250 may further include pressure sensor(s), proximity sensor(s), accelerometer(s), magnetometer(s), and/or other sensor(s) that are used to generate other sensor data that is in addition to audio data captured by the one or more microphones 211. The client device 250 at least selectively executes the automated assistant client 240. The automated assistant client 240 includes, in the example of FIG. 2, hotword detection engine 222, hotword free invocation engine 224, continued conversation engine 226, ASR engine 228, object detection engine 230, object classification engine 232, voice identification engine 234, and face identification engine 236. The automated assistant client 240 further includes speech capture engine 216, and visual capture engine 218. It should be understood that the ML engines and ML models depicted in FIG. 2 are provided for the sake of example, and are not meant to be limiting. For example, the automated assistant client 240 can further include additional and/or alternative engines, such as a TTS engine and a respective TTS model, VAD engine and a respective VAD model, an endpoint detector engine and a respective endpoint detector model, a lip movement engine and a r, and/or other engine(s) along with associated machine learning model(s). Moreover, it should be understood that one or more of the engines and/or models described herein can be combined, such that a single engine and/or model can perform the functions of multiple engines and/or models described herein.

One or more cloud-based automated assistant components 270 can optionally be implemented on one or more computing systems (collectively referred to as a "cloud" computing system) that are communicatively coupled to client device 250 via one or more of the networks described with respect to FIGS. 1A-1D as indicated generally by 299. The cloud-based automated assistant components 270 can be implemented, for example, via a cluster of high-performance servers. In various implementations, an instance of an automated assistant client 240, by way of its interactions with one or more cloud-based automated assistant components 270, may form what appears to be, from a user's perspective, a logical instance of an automated assistant as indicated generally by 295 with which the user may engage in a human-to-computer interactions (e.g., spoken interactions, gesture-based interactions, and/or touch-based interactions).

The client device 250 can be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client devices may be provided.

The one or more vision components 213 can take various forms, such as monographic cameras, stereographic cameras, a LIDAR component (or other laser-based component(s)), a radar component, etc. The one or more vision components 213 may be used, e.g., by the visual capture engine 218, to capture image data corresponding to vision frames (e.g., image frames, laser-based vision frames) of an environment in which the client device 250 is deployed. In some implementations, such vision frame(s) can be utilized to determine whether a user is present near the client device 250 and/or a distance of the user (e.g., the user's face) relative to the client device 250. Such determination(s) can be utilized, for example, in determining whether to activate the various on-device machine learning engines depicted in FIG. 2, and/or other engine(s). Further, the speech capture engine 218 can be configured to capture a user's spoken utterance(s) and/or other audio data captured via the one or more of the microphones 211.

As described herein, such audio data and other non-microphone sensor data (also referred to as client data) can be processed by the various engines depicted in FIG. 2 to make predictions at the client device 250 using corresponding ML models (that include the updated global ML models and/or the updated weights thereof) generated in the manner described above with respect to FIGS. 1A-1D.

As some non-limiting example, the hotword detection engine 222 can utilize a hotword detection model 222A to predict whether audio data includes one or more particular words or phrases to invoke the automated assistant 295 (e.g., "Ok Google", "Hey Google", "What is the weather Google?", etc.) or certain functions of the automated assistant 295; the hotword free invocation engine 224 can utilize a hotword free invocation model 224A to predict whether non-microphone sensor data (e.g., image data) includes a gesture or signal to invoke the automated assistant 295 (e.g., based on a gaze of the user and optionally further based on mouth movement of the user); the continued conversation engine 226 can utilize a continued conversation model 226A to predict whether further audio data is directed to the automated assistant 295 (e.g., or directed to an additional user in the environment of the client device 250); the ASR engine 228 can utilize an ASR model 228A to generate recognized text, or predict phoneme(s) and/or token(s) that correspond to audio data detected at the client device 250 and generate the recognized text based on the phoneme(s) and/or token(s); the object detection engine 230 can utilize an object detection model 230A to predict object location(s) included in image data of an image captured at the client device 250; the object classification engine 232 can utilize an object classification model 232A to predict object classification(s) of object(s) included in image data of an image captured at the client device 250; the voice identification engine 234 can utilize a voice identification model 234 to predict whether audio data captures a spoken utterance of one or more users of the client device 250 (e.g., by generating a speaker embedding, or other representation, that can be compared to a corresponding actual embeddings for one or more of the user of the client device 250); and the face identification engine 236 can utilize a face identification model to predict whether image data captures one or more of the users in an environment of the client device 250 (e.g., by generating an image embedding, or other representation, that can be compared to a corresponding image embeddings for one or more of the user of the client device 250).

In some implementations, the client device 250 may further include natural language understanding (NLU) engine 238 and fulfillment engine 240. The NLU engine 238 may perform on-device natural language understanding, utilizing NLU model 238A, on recognized text, predicted phoneme(s), and/or predicted token(s) generated by the ASR engine 228 to generate NLU data. The NLU data can include, for example, intent(s) that correspond to the spoken utterance and optionally slot value(s) for parameter(s) for the intent(s). Further, the fulfillment engine 240 can generate fulfillment data utilizing on-device fulfillment model 240A, and based on processing the NLU data. This fulfillment data can define local and/or remote responses (e.g., answers) to spoken utterances provided by a user of the client device 250, interaction(s) to perform with locally installed application(s) based on the spoken utterances, command(s) to transmit to Internet-of-things (IoT) device(s) (directly or via corresponding remote system(s)) based on the spoken utterance, and/or other resolution action(s) to perform based on the spoken utterance. The fulfillment data is then provided for local and/or remote performance/execution of the determined action(s) to resolve the spoken utterance. Execution can include, for example, rendering local and/or remote responses (e.g., visually and/or audibly rendering (optionally utilizing an on-device TTS module)), interacting with locally installed applications, transmitting command(s) to IoT device(s), and/or other action(s). In other implementations, the NLU engine 234 and the fulfillment engine 240 may be omitted, and the ASR engine 228 can generate the fulfillment data directly based on the audio data. For example, assume the ASR engine 228 processes, using the ASR model 228A, a spoken utterance of "turn on the lights." In this example, the ASR engine 228 can generate a semantic output that is then transmitted to a software application associated with the lights and/or directly to the lights that indicates that they should be turned on.

Notably, the cloud-based automated assistant component(s) 270 include cloud-based counterparts to the engines and models described herein with respect to FIG. 2. However, in various implementations, these engines and models may not be invoked since the engines and models may be transmitted directly to the client device 250 and executed locally at the client device 250 as described above with respect to FIGS. 1A-1D. Nonetheless, a remote execution module can also optionally be included that performs remote execution based on local or remotely generated NLU data and/or fulfillment data. Additional and/or alternative remote engines can be included. As described herein, in various implementations on-device speech processing, on-device image processing, on-device NLU, on-device fulfillment, and/or on-device execution can be prioritized at least due to the latency and/or network usage reductions they provide when resolving a spoken utterance (due to no client-server roundtrip(s) being needed to resolve the spoken utterance). However, one or more cloud-based automated assistant component(s) 280 can be utilized at least selectively. For example, such component(s) can be utilized in parallel with on-device component(s) and output from such component(s) utilized when local component(s) fail. For example, if any of the on-device engines and/or models fail (e.g., due to relatively limited resources of client device 150), then the more robust resources of the cloud may be utilized.

Turning now to FIG. 3, a flowchart illustrating an example method 300 of generating client gradient(s) locally at a client device to be utilized in updating machine learning model(s) is depicted. For convenience, the operations of the method 300 are described with reference to a system that performs the operations. The system of method 300 includes one or more processors and/or other component(s) of a client device (e.g., client device 150 of FIG. 1, client device 250 of FIG. 2, computing device 610 of FIG. 6, and/or other client devices). Moreover, while operations of the method 300 are shown in a particular order, this is not meant to be limiting. One or more operations may be reordered, omitted, or added.

At block 352, the system identifies, at a client device, client data. In some implementations, block 352 includes optional sub-block 352A. At optional sub-block 352A, the system detects audio data that captures a spoken utterance in an environment of the client device via one or more microphone(s) of the client device. The audio data may capture at least a part of a spoken utterance of a user of the client device. In other implementations, block 352 includes optional sub-block 352B. At optional sub-block 352B, the system detects non-microphone sensor data via non-microphone sensor(s) of the client device. The non-microphone sensor data may include, for example, image data that captures an environment of the client device via vision component(s) of the client device and/or textual segments.

At block 354, the system processes, using an on-device ML(s) model stored locally at the client device, the client data to generate predicted output(s). The predicted output(s) generated using the on-device ML model(s) may be based on the client data identified at block 352 and the on-device ML model(s) utilized to process the client data at block 354. For example, in implementations where the client data corresponds to audio data, one or more audio-based models can be utilized to process the client data to generate corresponding predicted outputs. For instance, a hotword model can be utilized to process the audio data to generate predicted output associated with whether or not the audio data includes a particular word or phrase to invoke an automated assistant, an ASR model can be utilized to process the audio data to generate predicted output associated with predicted text for the audio data, etc. As another example, in implementations where the client data corresponds to image data, one or more image-based models can be utilized to process the client data to generate corresponding predicted outputs. For instance, a hotword free invocation model can be utilized to process the image data to generate predicted output associated with whether or not the image data includes a gesture or mouth movement to invoke an automated assistant, an object recognition model can be utilized to process the image data to generate predicted output associated with classification of one or more objects captured in the image data, etc.

At block 356, the system generates a gradient based on the predicted output. In some implementations, block 356 includes optional sub-block 356A. At optional sub-block 356A, the system generated the gradient using supervised learning locally at the client device. In these implementations, the system can compare the predicted output to corresponding ground truth output. The system can utilize one or more supervision signals as the corresponding ground truth output. For example, assume the client device generates audio data capturing a particular word or phrase to invoke the automated assistant, but the predicted output generated a hotword model indicates that the audio data did not include the particular word or phrase to invoke the automated assistant. Further assume the user subsequently invoked the automated assistant (e.g., via an additional spoken utterance or other user input to invoke the automated assistant (e.g., a squeeze of the client device or touch input directed to an automated assistant graphical element)). In this example, the system can determine the automated assistant should have been invoked based on the spoken utterance (e.g., a false negative), and the corresponding ground truth output for the predicted output indicates that the automated assistant should have been invoked.

As another example, assume the client device generates audio data capturing a particular word or phrase to invoke the automated assistant, and the predicted output generated a hotword model indicates that the audio data includes the particular word or phrase to invoke the automated assistant. Further assume the user subsequently canceled the invocation of the automated assistant (e.g., via an additional spoken utterance or other user input to invoke the automated assistant (e.g., a squeeze of the client device or touch input directed to an automated assistant graphical element)). In this example, the system can determine the automated assistant should not have been invoked based on the spoken utterance (e.g., a false positive), and the corresponding ground truth output for the predicted output indicates that the automated assistant should not have been invoked. Although block 356 is described with respect to supervision signals for a hotword model, it should be understood that is for the sake of example and is not meant to be limiting, and that any supervision signals generated based on user feedback and/or inferred by the system can be utilized. For instance, if an ASR model processes the audio data and a transcription of one or more ASR speech hypotheses are presented to a user, any modifications to the transcription can be utilized as a supervision signal. Also, for instance, if a voice identification model processes the audio data to authenticate an identity of a user, but the user is not recognized and the user subsequently provides a password or other authenticating information, this other authenticating information can be utilized as a supervision signal.

In other implementations, block 356 includes optional sub-block 356B. At optional sub-block 356B, the system generated the gradient using unsupervised learning (or semi-supervised learning) locally at the client device. Notably, in these implementations, there is no supervision signal for the system to utilize in generating the gradient. For example, assume that the client data identified at the client device is image data captured via the vision component(s) of the client device, and that an on-device image-based ML model seeks to reconstruct the image data based on the encoding of the image data, resulting in a predicted image data. In this example, the system can compare the image data to the predicted image data to determine a difference therebetween, and the system can generate the gradient based on the determined difference. As another example, assume that the client data detected at the client device is audio data, including a first portion and a second portion that follows the first portion, captured via the microphone(s) of the client device, and that the on-device ML model seeks to predict the second portion of the audio data based on an encoding of the first portion of the audio data, resulting in a predicted second portion of the audio data. In this example, the system can compare the second portion of the audio data to the predicted second portion of the audio data to determine a difference therebetween, and the system can generate the gradient based on the determined difference.

At block 358, the system determines whether condition(s) for transmitting the gradient generated at block 356 are satisfied. The condition(s) can include, for example, that the client device is charging, that the client device has at least a threshold state of charge, that a temperature of the client device (based on one or more on-device temperature sensors) is less than a threshold, that the client device is not being held by a user, temporal condition(s) associated with the client device(s) (e.g., between a particular time period, every N hours, where N is a positive integer, and/or other temporal condition(s) associated with the client device(s)), whether a threshold number of gradient(s) have been generated by the client device, and/or other condition(s). If, at an iteration of block 358, the system determines that the condition(s) for transmitting the gradient generated at block 356 are not satisfied, then the system can continuously monitor for whether the condition(s) are satisfied at block 358. Notably, as the system monitors for satisfaction of the condition(s) at block 358, the system can continue generating additional gradient(s) in accordance with blocks 352-356 of the method 300. If, at an iteration of block 358, the system determines that the condition(s) for transmitting the gradient generated at block 356 are satisfied, then the system can proceed to block 360.

At block 360, the system transmits, to a remote system and from the client device, the generated gradient to cause the remote system to utilize the generated gradient to update weights of global ML model(s) stored remotely at the remote system. Moreover, a plurality of additional client devices can generate additional gradients according to the method 300, and can transmit the additional gradients to the remote system when respective condition(s) are satisfied at the additional client devices (e.g., the additional client devices 170 of FIG. 1).

At block 362, the system receives, at the client device and from the remote system, updated ML model(s) and/or updated weights thereof. Notably, blocks 360 and 362 are not connected by an arrow. This indicates that the updated ML model(s) and/or the updated weights thereof are received at the client device when the remote system determines to transmit that the updated ML model(s) and/or the updated weights to the client device based on satisfaction of one or more conditions at the client device and/or the remote system. The client device can replace, in local memory, corresponding on-device ML models and/or corresponding weights thereof with the updated ML model(s) and/or the updated weights thereof.

At block 364, the system uses the updated ML model to make at least one prediction based on additional client data identified at the client device. The predictions made at the client device may depend on the updated ML model received from the remote system at block 362.

Although the method 300 of FIG. 3 is generally described with respect to audio-based models, it should be understood that is for the sake of example and is not meant to be limiting. For instance, the techniques described herein can also be utilized to generate client gradients and transmit the client gradients to a remote system for updating image-based models, text-based models, and/or any other ML model. Moreover, multiple instances of the method 300 of FIG. 3 can be performed, in parallel, at the client device and/or additional client devices of the user and/or other users to generate various gradients and/or transmit various gradients to the remote system.

Figure 4:
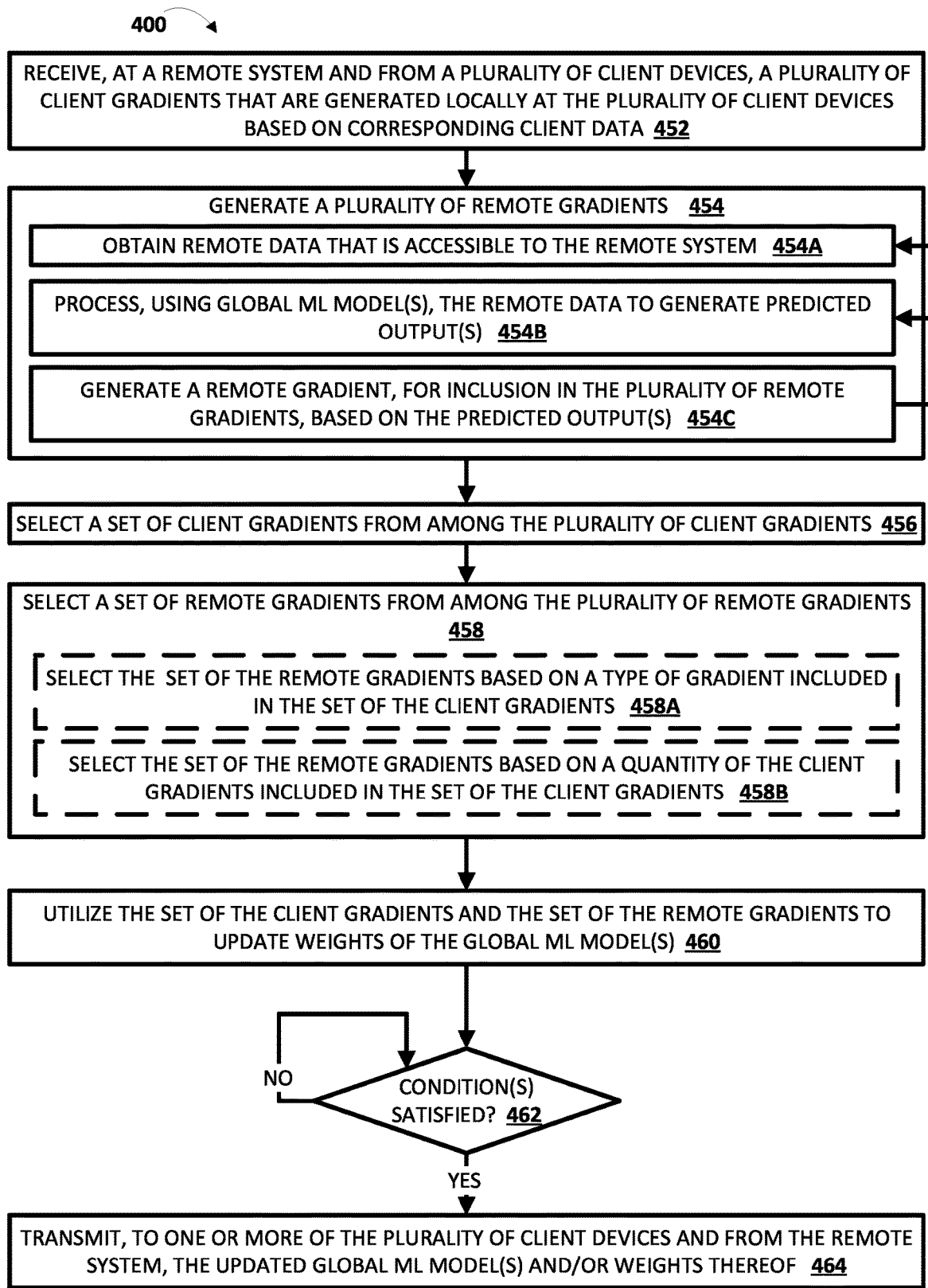
FIG. 4 depicts a flowchart illustrating an example method of generating remote gradient(s) remotely at a remote system to be utilized in updating machine learning model(s), in accordance with various implementations.

Turning now to FIG. 4, a flowchart illustrating an example method 400 of generating remote gradient(s) remotely at a remote system to be utilized in updating machine learning model(s) is depicted. For convenience, the operations of the method 400 are described with reference to a system that performs the operations. The system of method 400 includes one or more processors and/or other component(s) of a remote system (e.g., remote system 160 of FIG. 1, computing device 610 of FIG. 6, and/or any other computing device). Moreover, while operations of the method 400 are shown in a particular order, this is not meant to be limiting. One or more operations may be reordered, omitted, or added.

At block 452, the system receives, at a remote system and from a plurality of client devices, a plurality of client gradients that are generated locally at the plurality of client devices based on corresponding client data. Each of the plurality of client gradients can be generated at the plurality of client devices in the same or similar manner described with respect to the method 300 of FIG. 3.

At block 454, the system generates a plurality of remote gradients. Block 454 can, for example, perform the operations of sub-blocks 454A, 454B, and 454C to generate a remote gradient. At sub-block 454A, the system obtains remote data that is accessible to the remote system. In some implementations, the remote data can be retrieved from an online video-sharing platform, image-sharing platform, audio-sharing platform, and/or text-based platform that is not access-restricted like the client data generated locally at a corresponding one of the client devices and/or received locally at the corresponding one of the client devices. In additional or alternative implementations, and with permission of a corresponding user of the corresponding one of the plurality of client devices, the remote data can be data that is access-restricted data that is accessible to the remote system. Moreover, the remote data can correspond to data generated by devices having different characters (e.g., different types of microphone(s), different types of vision component(s), etc.). At sub-block 454B, the system processes, using global ML model(s), the remote data to generate predicted output(s). At sub-block 454C, the system generates a remote gradient, for inclusion in the plurality of remote gradients based on the predicted output(s). The system can return to sub-block 454A to obtain additional remote data to generate an additional gradient, and/or return to sub-block 454B to generate additional predicted output(s) based on the same remote data. The system can process the remote data to generate the predicted output(s) in the same or similar manner described with respect to block 354 of the method 300 of FIG. 3, but using the global ML model(s) instead of the on-device ML model(s). Further, the system can generate the remote gradient based on the predicted output(s) in the same or similar manner described with respect to block 356 of the method 300 of FIG. 3, but based on the predicted output(s) generated based on the remote data.

In some implementations, the system can repeat this process of generating the remote gradients until a threshold quantity of remote gradients are generated. For example, the system can continue generating the remote gradients until a quantity of the gradients matches a quantity of client gradients received from the plurality of client devices, a threshold quantity defined by a developer, or some other quantitative threshold. In some versions of those implementations, the threshold quantity of remote gradients generated by the remote system can be based on corresponding types of client gradients that are received from the plurality of client devices. For example, assume 1,000 client gradients are received from the plurality of client devices, assume 500 client gradients, of the 1,000 client gradients, are audio-based client gradients and the other 500 of the 1,000 client gradients are image-based client gradients. In this example, the system can obtain audio-based remote data, process the audio-based remote data, using various audio-based global ML models, to generate the predicted output(s), and process the predicted output(s) to generate audio-based remote gradients. This process can be repeated until there are 500 audio-based remote gradients. Further assume that, out of those 500 audio-based client gradients, 300 of the audio-based client gradients are client hotword gradients, and the other 200 of the audio-based client gradients are client ASR gradients. In this example, the system can process remote audio data using global hotword model(s) to generate 300 remote hotword gradients, and can process remote audio data using ASR model(s) to generate 200 remote ASR gradients.

At block 456, the system selects a set of client gradients from among the plurality of client gradients received at block 452. In some implementations, the system can select the set of client gradients based on one or more criteria. The one or more criteria can include, for example, the types of client gradients available to the system, a threshold quantity of client gradients available to the system, a threshold duration of time of updating using the client gradients, and/or other criteria. For example, the system can select a set of 500 audio-based client gradients to be utilized to update audio-based model(s) (e.g., a single audio-based model or multiple disparate audio-based models), select a set of 200 hotword client gradients to be utilized to update hotword model(s), and so on. As another example, the system can select a set of 600 image-based client gradients to be utilized to update image-based model(s) (e.g., a single image-based model or multiple disparate image-based models), select a set of 300 hotword client gradients to be utilized to update hotword free invocation model(s), and so on. In other implementations, the set of client gradients can include any combination of audio-based client gradients, image-based client gradients, text-based client gradients, and/or any other types of client gradients (or particular types of client gradients).

At block 458, the system selects a set of remote gradients from among the plurality of remote gradients. In some implementations, block 458 includes optional sub-block 458A. At optional sub-block 458A, the system selects the set of the remote gradients based on a type of gradient included in the set of the client gradients. For example, if the set of client gradients selected at block 456 includes a set of audio-based gradients (or a particular type of audio-based gradient), the set of remote gradients selected at block 458 can also include audio-based gradients. In additional or alternative implementations, block 458 includes optional sub-block 458B. At optional sub-block 458B, the system additionally or alternatively selects the set of the remote gradients based on a quantity of the client gradients included in the set of the client gradients. For example, if the set of client gradients selected at block 456 includes a set of 500 audio-based gradients (or a particular type of audio-based gradient), the set of remote gradients selected at block 458 can also include 500 audio-based gradients. As another example, if the set of client gradients selected at block 456 includes a set of 500 audio-based gradients (or a particular type of audio-based gradient), the set of remote gradients selected at block 458 can also include a proportional quantity of audio-based gradients (e.g., 250 for 50%, 100 for 20%, etc.). In other implementations, the set of remote gradients can include any combination of audio-based remote gradients, image-based remote gradients, text-based remote gradients, and/or any other types of remote gradients (or particular types of remote gradients).

At block 460, the system utilizes the set of the client gradients and the set of the remote gradients to update weights of the global ML model(s). In particular, the system can update weights of corresponding ML model(s) based on the gradients included in the set of client gradients and/or the set of remote gradients. For example, and referring briefly to FIG. 5, various example methods of mixing a set of client gradient(s) and a set of remote gradient(s) in updating global machine learning model(s) at block 460 of FIG. 4 are depicted.

In some implementations, and as shown by the method 460A of FIG. 5, the system can utilize the set of client gradients to update weights of the global ML model(s) at block 552A, and subsequently utilize the set of the remote gradients to further update the weights of the global ML model(s). For example, assume the set of client gradients include a plurality of ASR client gradients and assume the set of remote gradients include a plurality of ASR remote gradients. In this example, the system can update weights of one or more global ASR models based on the plurality of ASR client gradients, and then subsequently update the weights of the one or more global ASR models based on the plurality of ASR remote gradients.

In other implementations, and as shown by the method 460B of FIG. 5, the system can utilize the set of remote gradients to update weights of the global ML model(s) at block 552B, and subsequently utilize the set of the client gradients to further update the weights of the global ML model(s). For example, assume the set of client gradients include a plurality of ASR client gradients and assume the set of remote gradients include a plurality of ASR remote gradients. In this example, the system can update weights of one or more global ASR models based on the plurality of ASR remote gradients, and then subsequently update the weights of the one or more global ASR models based on the plurality of ASR client gradients.

Figure 5:
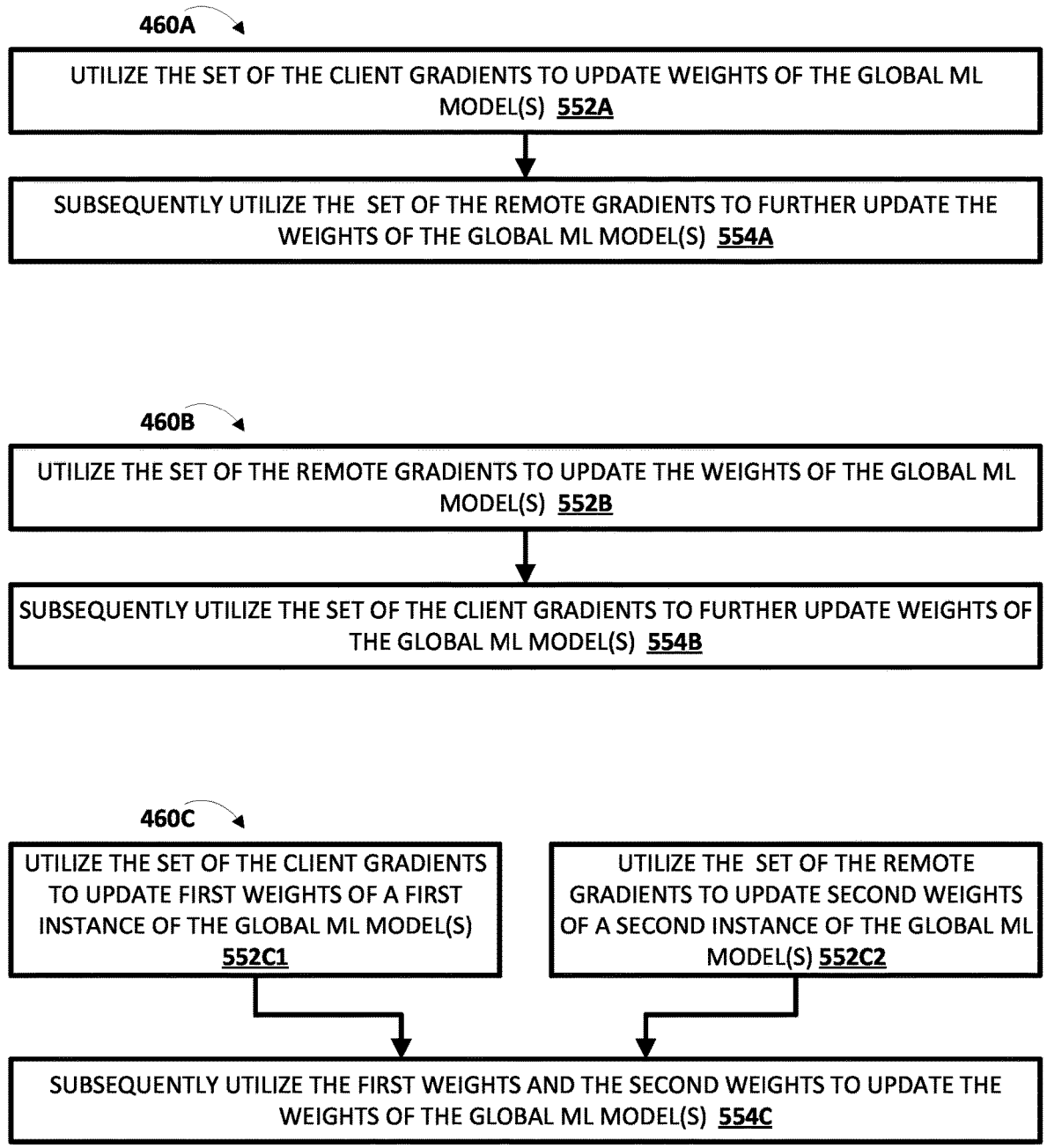
FIG. 5 depicts flowcharts illustrating various example methods of mixing a set of client gradients and a set of remote gradients in updating global machine learning model(s), in accordance with various implementations.

In yet other implementations, and as shown by the method 460C of FIG. 5, the system can utilize the set of client gradients to update first weights of first instance(s) the global ML model(s) at block 552C1, and, in a parallel or serial manner, utilize the set of second gradients to update second weights of second instance(s) the global ML model(s) at block 552C2. Further, the system can subsequently utilize the first weights and the second weights to update the weights of the global ML model. For example, assume the set of client gradients include a plurality of ASR client gradients and assume the set of remote gradients include a plurality of ASR remote gradients. In this example, the system can update first weights of one or more first instance(s) of one or more global ASR models based on the plurality of ASR client gradients, and, in a parallel or serial manner, update second weights of second instance(s) of the one or more global ASR models based on the plurality of ASR remote gradients. Further, the system can analyze the updated first weights and the updated second weights, and utilize some combination of the updated first weights and the updated second weights to update one or more of the global ASR models. For instance, the system can determine an average of the updated first weights and the updated second weights, and utilize the average weights as the updated weights for one or more of the global ASR models.

Although the methods 460A, 460B, and 460C of FIG. 5 are described with respect to ASR gradients utilized to update one or more global ASR models, it should be understood that is for the sake of example and is not meant to be limiting. For example, the techniques described herein can be utilized to update various global ML models or weights thereof based on corresponding gradients that are associated with the various global ML models.

Turning back to FIG. 4, in some alternative implementations, the system can utilize the plurality of client gradients received at block 452 and the plurality of remote gradients 454 generated at block 456 to update weights of the global ML model(s) without performing the operations of block 456 and block 458. In these implementations, the system can process the plurality of client gradients and the plurality of remote gradients in a FIFO manner. For example, the system can identify the type of client gradient(s) received and/or the type of remote gradient(s) generated, identify the corresponding global ML model(s) associated with the type of client and/or remote gradient(s), and update the corresponding global ML model(s) as the gradient(s) are received at the remote system and/or generated by the remote system.

Notably, the system can repeat the operations of blocks 452-460 (or simply 452, 454, and 460) until the updating of the global ML model(s) is complete. The system can determine that the updating of the global ML model(s) is complete based on, for example, a threshold duration of time being spent updating the global ML model(s), a threshold quantity of gradients (remote gradients and/or client gradients) since the weights of the global ML model was last updated, a measured improvement to the global ML model(s), and/or passage of a threshold duration of time since the global ML model(s) was last trained, and/or other criteria. Once the global ML model(s) is updated, the system may then proceed to block 458.

At block 462, the system determines whether condition(s) for transmitting the global ML model(s) and/or the weights thereof at block 460 are satisfied. The condition(s) can be based on whether the client device(s) are ready to receive the global ML model(s) and/or the weights thereof (e.g., the same as the conditions described above with respect to block 358 of FIG. 3), other conditions that are specific to the remote system, such as based on performance of the global ML model(s) satisfying a performance threshold, based on the global ML model(s) being updated based on a threshold quantity of gradients, etc., and/or some combination of these condition(s). If, at an iteration of block 462, the system determines that the condition(s) for transmitting the global ML model(s) and/or the weights thereof updated at block 460 are not satisfied, then the system can continuously monitor for whether the condition(s) are satisfied at block 462. Notably, as the system monitors for satisfaction of the condition(s) at block 462, the system can continue updating the global ML model(s) in accordance with blocks 452-460 of the method 400. If, at an iteration of block 462, the system determines that the condition(s) for transmitting the global ML model(s) and/or the weights thereof updated at block 460 are satisfied, then the system can proceed to block 464.

At block 464, the system transmits, to one or more of the plurality of client devices and from the remote system, the updated global ML model(s) and/or the weights thereof. The system can transmit the updated global ML model(s) and/or the weights thereof to each of the plurality of client devices that transmitted client gradients to the remote system, additional client devices beyond those that transmitted the client gradients to the remote system, or a subset of those client devices that transmitted the client gradients to the remote system.

In various implementations, the updated global ML model(s) and/or the weights thereof can be transmitted to client devices based on a geographic region and/or other properties of the plurality of client devices or users of the plurality of client devices (e.g., a primary language). For example, the global ML model(s) that are updated can be one of N available machine learning models for a given language (e.g., where N is a positive integer), but can be updated based on client gradients that are specific to a particular geographic region and provided to the client devices primarily located in the particular geographic region. This enables, for instance, instances of global ASR model(s) to be trained based on client ASR gradients that are specific to particular regions and can be updated to account for different accents and dialects.

Although the method 400 of FIG. 4 is generally described with respect to audio-based models, it should be understood that is for the sake of example and is not meant to be limiting. For instance, the techniques described herein can also be utilized to remote client gradients and transmit the client gradients to a remote system for updating image-based models, text-based models, and/or any other ML model. Moreover, multiple instances of the method 400 of FIG. 4 can be performed, in parallel, by the remote system to generate various remote gradients and/or update various global ML model(s).

Figure 6:
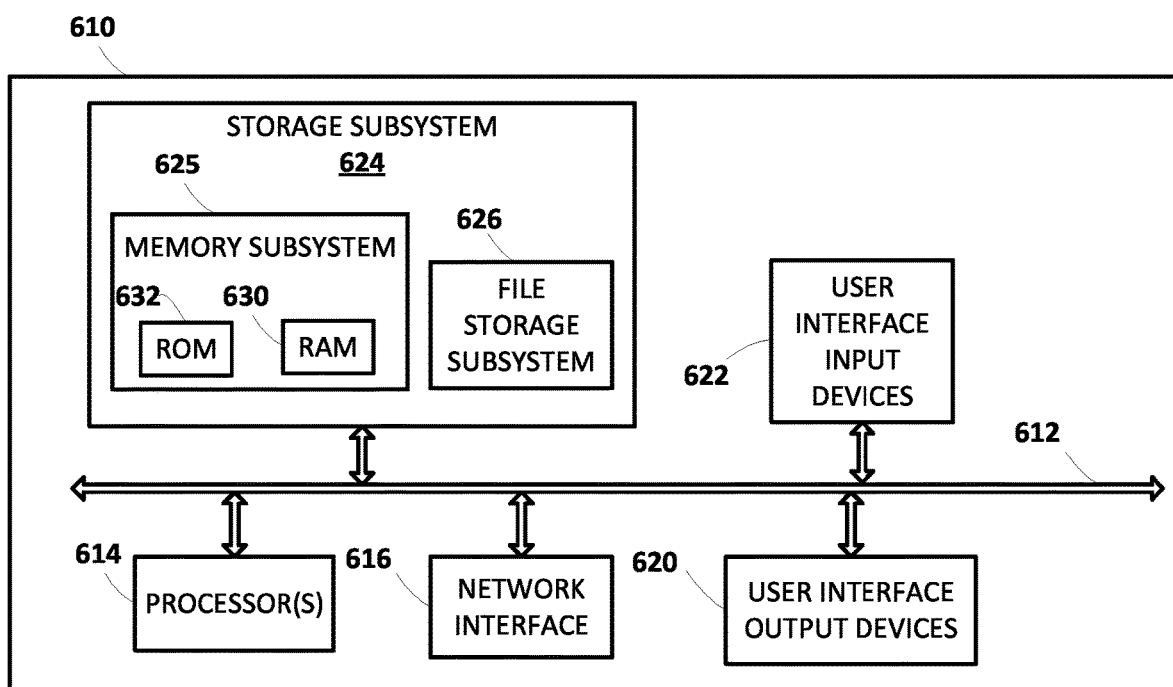
FIG. 6 depicts an example architecture of a computing device, in accordance with various implementations.

Turning now to FIG. 6, a block diagram of an example computing device 610 that may optionally be utilized to perform one or more aspects of techniques described herein is depicted. In some implementations, one or more of a client device, cloud-based automated assistant component(s), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods disclosed herein, as well as to implement various components depicted in FIGS. 1A-1D These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method performed by one or more processors of a client device is provided and includes receiving a plurality of client gradients from a plurality of corresponding client devices. Each of the plurality of client gradients is generated locally at a given one of the plurality of corresponding client devices based on processing corresponding audio data that captures at least part of a corresponding spoken utterance of a corresponding user of the given one of the plurality of corresponding client devices. The method further includes generating a plurality of remote gradients. Generating each of the plurality of remote gradients includes obtaining additional audio data that captures at least part of an additional spoken utterance of an additional user; processing, using a global machine learning (ML) model stored remotely at the remote system, the additional audio data to generate predicted output; and generating an additional gradient, for inclusion in the plurality of remote gradients, based on comparing the additional predicted output to ground truth output corresponding to the additional audio data. The method further includes selecting a set of client gradients from among the plurality of client gradients; selecting an additional set of remote gradients from among the plurality of remote gradients; and utilizing the set of client gradients and the additional set of remote gradients to update weights of the global ML model.

These and other implementations of the technology can include one or more of the following features.

In some implementations, utilizing the set of client gradients and the additional set of remote gradients to update the weights of the global ML model can include utilizing the set of client gradients to update the weights of the global ML model; and subsequent to utilizing the set of client gradients to update the weights of the global ML model: utilizing the additional set of remote gradients to further update the weights of the global ML model.

In some implementations, utilizing the set of client gradients and the additional set of remote gradients to update the weights of the global ML model can include utilizing the additional set of remote gradients to update the weights of the global ML model; and subsequent to utilizing the additional set of remote gradients to update the weights of the global ML model: utilizing the set of client gradients to further update the weights of the global ML model.

In some implementations, utilizing the set of client gradients and the additional set of remote gradients to update the weights of the global ML model can include utilizing the set of client gradients to update first weights of a first instance the global ML model; utilizing, in parallel, the additional set of remote gradients to update to update second weights of a second instance of the global ML model; and utilizing the updated first weights of the first instance of the global ML model and the updated second weights of the second instance of the global ML model to update the weights of the global ML model. In some versions of those implementations, utilizing the updated first weights of the first instance of the global ML model and the updated second weights of the second instance of the global ML model to update the weights of the global ML model can include determining an average of the updated first weights of the first instance of the global ML model and the updated second weights of the second instance of the global ML model; and utilizing the average of the updated first weights and the updated second weights to update the weights of the global ML model.

In some implementations, the threshold quantity of additional gradients can be based on a quantity of the plurality of gradients received from the plurality of corresponding client devices.

In some implementations, selecting the set of client gradients can include selecting one or more of the plurality of client gradients for inclusion in the set of client gradients based on the one or more of the plurality of client gradients being a particular type of gradient. In some versions of those implementations, selecting the additional set of remote gradients can include selecting one or more of the plurality of remote gradients for inclusion in the additional set of remote gradients based on the one or more of the plurality of remote gradients being the particular type of gradient.

In some implementations, selecting the set of client gradients can include selecting one or more of the plurality of client gradients for inclusion in the set of client gradients based on the one or more of the plurality of client gradients being a particular type of gradient. In some versions of those implementations, selecting the additional set of remote gradients can include selecting one or more of the plurality of remote gradients for inclusion in the additional set of remote gradients based on the one or more of the plurality of remote gradients being the particular type of gradient.

In some implementations, the method can further include analyzing a distribution of remote gradients stored in one or more databases that are accessible by the remote system to identify a particular type of gradient. The plurality of remote gradients that are generated can conform to the particular type of gradient. In some versions of those implementations, identifying the particular type of gradient can include determining, based on analyzing the distribution of remote gradients, that the distribution of remote gradients does not include a threshold quantity of remote gradients of the particular type of gradient.

In some implementations, the method can further include transmitting, to the client device, the updated global ML model or the updated global weights of the global ML model. Transmitting the global ML model or the updated global weights can be subsequent to the remote system updating the global weights of the global ML model based on the set of client gradients and the additional set of remote gradients. Further, transmitting the updated global ML model or the updated global weights to the client device can cause the client device to replace, in local storage of the client device, an on-device ML model with the updated global ML model or local weights of the on-device ML model with the updated global weights of the global ML model.

In some implementations, the ground truth output corresponding to the additional audio data can be based on the additional spoken utterance captured in the additional audio data. In some versions of those implementations, the additional spoken utterance captured in the additional audio data can include a particular word or phrase, and the ground truth output corresponding to the additional audio data can include an indication of whether the additional spoken utterance captures the particular word or phrase. In additional or alternative versions of those implementations, the additional spoken utterance captured in the additional audio data can include one or more terms, and the ground truth output corresponding to the additional audio data can include a transcription of the one or more terms.

In some implementations, a method performed by one or more processors of a client device is provided and includes, by one or more client processors of a client device: detecting, via one or more microphones of the client device, audio data that captures at least part of a spoken utterance of a user of the client device; processing, using an on-device machine learning (ML) model stored locally on the client device, the audio data to generate predicted output; generating a client gradient based on the predicted output; and transmitting, to a remote system and from the client device, the client gradient. The method further includes, by one or more remote processors of the remote system: obtaining additional audio data that captures at least part of an additional spoken utterance of an additional user; processing, using a global ML model stored remotely at the remote system, the additional audio data to generate additional predicted output; generating a remote gradient based on the additional predicted output; and utilizing the client and the remote gradient to update weights of the global ML model.

These and other implementations of the technology can include one or more of the following features.

In some implementations, utilizing the client and the remote gradient to update the weights of the global ML model can include utilizing the client gradient, and additional client gradients received from corresponding additional client devices, to update the weights of the global ML model; and subsequent to utilizing the client gradient and the additional client gradients to update the weights of the global ML model: utilizing the remote gradient, and additional remote gradients generated at the remote system, to further update the weights of the global ML model.

In some implementations, utilizing the client and the remote gradient to update the weights of the global ML model can include utilizing the remote gradient, and additional remote gradients generated at the remote system, to update the weights of the global ML model; and subsequent to utilizing the remote gradient and the additional remote gradients to update the weights of the global ML model: utilizing the client gradient, and additional client gradients received from corresponding additional client devices, to further update the weights of the global ML model.

In some implementations, utilizing the client and the remote gradient to update the weights of the global ML model can include utilizing the client gradient, and additional client gradients received from corresponding additional client devices, to update first weights of a first instance of the global ML model; utilizing, in parallel, the remote gradient, and additional remote gradients generated at the remote system, to update the second weights of a second instance of the global ML model; and utilizing the updated first weights of the first instance of the global ML model and the updated second weights of the second instance of the global ML model to update the weights of the global ML model.

In some implementations, the remote gradient generated based on processing the additional audio data by one or more of the processors of the remote system can be of a same type of gradient corresponding to the client gradient generated based on processing the audio data by one or more of the processors of the client device. In some versions of those implementations, the type of gradient can include one of: a hotword gradient, an automatic speech recognition (ASR) gradient, a voice activity detection (VAD) gradient, a continued conversation gradient, or a voice identification gradient.

In some implementations, the remote gradient generated based on processing the additional audio data by one or more of the processors of the remote system can be of a different type of gradient corresponding to the client gradient generated based on processing the audio data by one or more of the processors of the client device.

In some implementations, generating the client gradient based on the predicted output can include comparing the predicted output to ground truth output corresponding to the audio data, and generating the remote gradient based on the additional predicted output can include comparing the additional predicted output to additional ground truth output corresponding to the additional audio data.

In some implementations, transmitting the client gradient can be over a network, and can include transmitting the gradient without transmitting any of: the audio data and the predicted output.

In some implementations, the method further includes, by one or more remote processors of the remote system: transmitting, to the client device, the updated global ML model or the updated global weights of the global ML model. Transmitting the global ML model or the updated global weights can be subsequent to the remote system updating the global weights of the global ML model based on the client gradient and the remote gradient. In some versions of those implementations, the method can further include, by one or more of the processors of the client device: receiving, from the remote system, the updated global ML model or the updated global weights of the global ML model; and causing the client device to replace, in local storage of the client device, the on-device ML model with the updated global ML model or local weights of the on-device ML model with the updated global weights of the global ML model.

In some implementations, a method performed by one or more processors of a client device is provided and includes, by one or more client processors of at a client device: identifying a textual segment stored locally at the client device of a user; processing, using an on-device text-to-speech (TTS) model stored locally on the client device, the textual segment to generate synthesized speech audio data that includes synthesized speech corresponding to the textual segment; processing, using a local machine learning (ML) model stored locally on the client device, the synthesized speech audio data to generate predicted output; generating a gradient based on comparing the predicted output to ground truth output corresponding to the textual segment; and transmitting, to a remote system and from the client device, the generated gradient. The method further includes, by one or more remote processors of the remote system: obtaining an additional textual segment that is accessible by the remote system; processing, using a global TTS model stored remotely at the remote system, the additional textual segment to generate additional synthesized speech audio data that includes additional synthesized speech corresponding to the additional textual segment; processing, using a global ML model stored remotely at the remote system, the additional synthesized speech audio data to generate additional predicted output; generating an additional gradient based on comparing the additional predicted output to additional ground truth output corresponding to the additional textual segment; and utilizing at least the gradient received from the client device and the additional gradient generated at the remote system to update weights of the global TTS model.

In some implementations, a method performed by one or more processors of a client device is provided and includes receiving a plurality of client gradients from a plurality of corresponding client devices. Each of the plurality of client gradients is generated locally at a given one of the plurality of corresponding client devices based on processing corresponding image data that captures at least part of a corresponding environment of a corresponding user of the given one of the plurality of corresponding client devices. The method further includes generating a plurality of remote gradients. Generating each of the plurality of remote gradients includes obtaining additional image data that captures at least part of an additional environment of an additional user; processing, using a global machine learning (ML) model stored remotely at the remote system, the additional image data to generate predicted output; and generating an additional gradient, for inclusion in the plurality of remote gradients, based on comparing the additional predicted output to ground truth output corresponding to the additional image data. The method further includes selecting a set of client gradients from among the plurality of client gradients; selecting an additional set of remote gradients from among the plurality of remote gradients; and utilizing the set of client gradients and the additional set of remote gradients to update weights of the global ML model.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s)) to perform a method such as one or more of the methods described herein. Other implementations can include an automated assistant client device (e.g., a client device including at least an automated assistant interface for interfacing with cloud-based automated assistant component(s)) that includes processor(s) operable to execute stored instructions to perform a method, such as one or more of the methods described herein. Yet other implementations can include a system of one or more servers that include one or more processors operable to execute stored instructions to perform a method such as one or more of the methods described herein.

What is claimed is:

1. A method implemented by one or more processors of a remote system, the method comprising:
receiving a plurality of client gradients from a plurality of corresponding client devices, wherein each of the plurality of client gradients is generated locally at a given one of the plurality of corresponding client devices based on processing corresponding audio data that captures at least part of a corresponding spoken utterance of a corresponding user of the given one of the plurality of corresponding client devices;
generating a plurality of remote gradients, wherein generating each of the plurality of remote gradients comprises:
obtaining additional audio data that captures at least part of an additional spoken utterance of an additional user;
processing, using a global machine learning (ML) model stored remotely at the remote system, the additional audio data to generate predicted output; and
generating an additional gradient, for inclusion in the plurality of remote gradients, based on comparing the additional predicted output to ground truth output corresponding to the additional audio data;
selecting a set of client gradients from among the plurality of client gradients;
selecting an additional set of remote gradients from among the plurality of remote gradients; and
utilizing the set of client gradients and the additional set of remote gradients to update weights of the global ML model.

2. The method of claim 1, wherein utilizing the set of client gradients and the additional set of remote gradients to update the weights of the global ML model comprises:
utilizing the set of client gradients to update the weights of the global ML model; and
subsequent to utilizing the set of client gradients to update the weights of the global ML model:
utilizing the additional set of remote gradients to further update the weights of the global ML model.

3. The method of claim 1, wherein utilizing the set of client gradients and the additional set of remote gradients to update the weights of the global ML model comprises:
utilizing the additional set of remote gradients to update the weights of the global ML model; and
subsequent to utilizing the additional set of remote gradients to update the weights of the global ML model:
utilizing the set of client gradients to further update the weights of the global ML model.

4. The method of claim 1, wherein utilizing the set of client gradients and the additional set of remote gradients to update the weights of the global ML model comprises:
utilizing the set of client gradients to update first weights of a first instance the global ML model;
utilizing, in parallel, the additional set of remote gradients to update second weights of a second instance of the global ML model; and
utilizing the updated first weights of the first instance of the global ML model and the updated second weights of the second instance of the global ML model to update the weights of the global ML model.

5. The method of claim 4, wherein utilizing the updated first weights of the first instance of the global ML model and the updated second weights of the second instance of the global ML model to update the weights of the global ML model comprises:
determining an average of the updated first weights of the first instance of the global ML model and the updated second weights of the second instance of the global ML model; and
utilizing the average of the updated first weights and the updated second weights to update the weights of the global ML model.

6. The method of claim 1, wherein the additional set of remote gradients includes a threshold quantity of additional gradients, and wherein the threshold quantity of additional gradients is based on a quantity of the plurality of client gradients received from the plurality of corresponding client devices.

7. The method of claim 1, wherein selecting the set of client gradients comprises:
   selecting one or more of the plurality of client gradients for inclusion in the set of client gradients based on the one or more of the plurality of client gradients being a particular type of gradient.

8. The method of claim 7, wherein selecting the additional set of remote gradients comprises:
   selecting one or more of the plurality of remote gradients for inclusion in the additional set of remote gradients based on the one or more of the plurality of remote gradients being the particular type of gradient.

9. The method of claim 1, wherein selecting the set of client gradients comprises:
   selecting one or more of the plurality of client gradients for inclusion in the set of client gradients based on the one or more of the plurality of client gradients being a particular type of gradient.

10. The method of claim 9, wherein selecting the additional set of remote gradients comprises:
    selecting one or more of the plurality of remote gradients for inclusion in the additional set of remote gradients based on the one or more of the plurality of remote gradients being the particular type of gradient.

11. The method of claim 1, further comprising:
    analyzing a distribution of remote gradients stored in one or more databases that are accessible by the remote system to identify a particular type of gradient, and wherein the plurality of remote gradients that are generated conform to the particular type of gradient.

12. The method of claim 11, wherein identifying the particular type of gradient comprises:
    determining, based on analyzing the distribution of remote gradients, that the distribution of remote gradients does not include a threshold quantity of remote gradients of the particular type of gradient.

13. The method of claim 1, further comprising:
    transmitting, to each of the plurality of corresponding client devices, the updated global ML model or the updated global weights of the global ML model, wherein transmitting the global ML model or the updated global weights is subsequent to the remote system updating the global weights of the global ML model based on the set of client gradients and the additional set of remote gradients; and
    wherein transmitting the updated global ML model or the updated global weights to each of the plurality of corresponding client devices causes each of the plurality of corresponding client devices to replace, in corresponding local storage, an on-device ML model with the updated global ML model or local weights of the on-device ML model with the updated global weights of the global ML model.

14. The method of claim 1, wherein the ground truth output corresponding to the additional audio data is based on the additional spoken utterance captured in the additional audio data.

15. The method of claim 14, wherein the additional spoken utterance captured in the additional audio data includes a particular word or phrase, and wherein the ground truth output corresponding to the additional audio data includes an indication of whether the additional spoken utterance captures the particular word or phrase.

16. The method of claim 14, wherein the additional spoken utterance captured in the additional audio data includes one or more terms, and wherein the ground truth output corresponding to the additional audio data includes a transcription of the one or more terms.

17. A method comprising:
    by one or more client processors of a client device:
       detecting, via one or more microphones of the client device, audio data that captures at least part of a spoken utterance of a user of the client device;
       processing, using an on-device machine learning (ML) model stored locally on the client device, the audio data to generate predicted output;
       generating a client gradient based on the predicted output; and
       transmitting, to a remote system and from the client device, the client gradient;
    by one or more remote processors of the remote system:
       obtaining additional audio data that captures at least part of an additional spoken utterance of an additional user;
       processing, using a global ML model stored remotely at the remote system, the additional audio data to generate additional predicted output;
       generating a remote gradient based on the additional predicted output; and
       utilizing the client and the remote gradient to update weights of the global ML model.

18. The method of claim 17, further comprising:
    by one or more remote processors of the remote system:
       transmitting, to the client device, the updated global ML model or the updated global weights of the global ML model, wherein transmitting the global ML model or the updated global weights is subsequent to the remote system updating the global weights of the global ML model based on the client gradient and the remote gradient.

19. The method of claim 18, further comprising:
    by one or more of the processors of the client device:
       receiving, from the remote system, the updated global ML model or the updated global weights of the global ML model; and
       causing the client device to replace, in local storage of the client device, the on-device ML model with the updated global ML model or local weights of the on-device ML model with the updated global weights of the global ML model.

20. A remote system comprising:
    one or more hardware processors; and
    memory storing instructions that, when executed by the one or more hardware processors, cause the one or more hardware processor to:
       receive a plurality of client gradients from a plurality of corresponding client devices, wherein each of the plurality of client gradients is generated locally at a given one of the plurality of corresponding client devices based on processing corresponding audio data that captures at least part of a corresponding spoken utterance of a corresponding user of the given one of the plurality of corresponding client devices;
       generate a plurality of remote gradients, wherein the instructions to generate each of the plurality of remote gradients comprise instructions to:
          obtain additional audio data that captures at least part of an additional spoken utterance of an additional user;

process, using a global machine learning (ML) model stored remotely at the remote system, the additional audio data to generate predicted output; and generate an additional gradient, for inclusion in the plurality of remote gradients, based on comparing the additional predicted output to ground truth output corresponding to the additional audio data;

select a set of client gradients from among the plurality of client gradients;

select an additional set of remote gradients from among the plurality of remote gradients; and utilize the set of client gradients and the additional set of remote gradients to update weights of the global ML model.

* * * * *